(12) United States Patent
Kosaka et al.

(10) Patent No.: US 12,071,573 B2
(45) Date of Patent: Aug. 27, 2024

(54) PRESSURE-SENSITIVE ADHESIVE SHEET AND METHOD FOR PEELING PRESSURE-SENSITIVE ADHESIVE SHEET

(71) Applicant: Nitto Denko Corporation, Ibaraki (JP)

(72) Inventors: Naofumi Kosaka, Ibaraki (JP); Yosuke Shimizu, Ibaraki (JP); Satoshi Honda, Ibaraki (JP); Taiki Shimokuri, Ibaraki (JP); Shou Takarada, Ibaraki (JP); Masayuki Satake, Ibaraki (JP); Kenichi Okada, Ibaraki (JP); Atsushi Takashima, Ibaraki (JP); Ginji Mizuhara, Ibaraki (JP); Masayuki Okamoto, Ibaraki (JP); Ryoko Asai, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 16/967,504

(22) PCT Filed: Jan. 28, 2019

(86) PCT No.: PCT/JP2019/002795
§ 371 (c)(1),
(2) Date: Aug. 5, 2020

(87) PCT Pub. No.: WO2019/151194
PCT Pub. Date: Aug. 8, 2019

(65) Prior Publication Data
US 2021/0214587 A1    Jul. 15, 2021

(30) Foreign Application Priority Data

Feb. 5, 2018    (JP) .................................. 2018-018621
Jun. 7, 2018    (JP) .................................. 2018-109385
Jul. 31, 2018   (JP) .................................. 2018-143420

(51) Int. Cl.
*C09J 7/38* (2018.01)
*B32B 7/06* (2019.01)
(Continued)

(52) U.S. Cl.
CPC ................. *C09J 7/385* (2018.01); *B32B 7/06* (2013.01); *B32B 27/18* (2013.01); *B32B 27/308* (2013.01);
(Continued)

(58) Field of Classification Search
CPC ... C09J 7/385; C09J 11/06; C09J 11/08; C09J 133/08; C09J 2301/408; C09J 2301/502;
(Continued)

(56) References Cited

U.S. PATENT DOCUMENTS 4,853,286 A    8/1989  Narimatsu et al.
4,928,438 A    5/1990  Narimatsu et al.
(Continued)

FOREIGN PATENT DOCUMENTS

CN      1618602 A       5/2005
CN      101896841 A    11/2010
(Continued)

OTHER PUBLICATIONS

Office Action issued for corresponding Japanese Patent Application No. 2019-012130 on Sep. 19, 2019, along with an English translation.
(Continued)

*Primary Examiner* — Nathan L Van Sell
(74) *Attorney, Agent, or Firm* — HAUPTMAN HAM, LLP

(57) ABSTRACT

Provided is a PSA sheet having a PSA layer. The PSA layer includes a layer A forming at least one surface thereof. The PSA sheet has an adhesive strength N0 of 2.0 N/10 mm or greater, after one day at room temperature following appli-
(Continued)

cation of the layer A side to a surface of an alkaline float glass plate as an adherend having a contact angle of 5°-10° with distilled water; has an N1 to N0 reduction rate of 30% or lower, wherein N1 is a water-resistant adhesive strength measured after stored at room temperature for one day, immersed in water for 30 minutes, taken out from the water and then residual water is wiped off, and has an N2 to N0 reduction rate of 40% or higher, wherein N2 is a water-peel strength measured after stored at room temperature for one day, 20 µL distilled water is dropped onto the adherend and is allowed to enter a PSA layer/adherend interfacial edge. N2 is measured at a tensile speed of 300 mm/min at a peel angle of 180°.

20 Claims, 2 Drawing Sheets

(51) Int. Cl.
  B32B 27/18    (2006.01)
  B32B 27/30    (2006.01)
  B32B 37/12    (2006.01)
  B32B 37/18    (2006.01)
  B32B 38/10    (2006.01)
  C09J 11/06    (2006.01)
  C09J 11/08    (2006.01)
  C09J 133/08   (2006.01)

(52) U.S. Cl.
  CPC ............ *B32B 37/12* (2013.01); *B32B 37/182* (2013.01); *B32B 38/10* (2013.01); *C09J 11/06* (2013.01); *C09J 11/08* (2013.01); *C09J 133/08* (2013.01); *B32B 2037/1276* (2013.01); *B32B 2307/728* (2013.01); *B32B 2333/12* (2013.01); *B32B 2405/00* (2013.01); *C09J 2301/408* (2020.08); *C09J 2301/502* (2020.08); *C09J 2433/00* (2013.01); *C09J 2467/006* (2013.01)

(58) Field of Classification Search
  CPC .... C09J 2433/00; C09J 2467/006; C09J 4/06; C09J 143/04; C09J 175/14; C09J 175/16; C09J 2301/312; C09J 5/00; C09J 7/38; C09J 11/00; C09J 133/04; C09J 133/06; C09J 201/00; C09J 2301/416; B32B 7/06; B32B 27/18; B32B 27/308; B32B 37/12; B32B 37/182; B32B 38/10; B32B 2037/1276; B32B 2307/728; B32B 2333/12; B32B 2405/00; B32B 27/00; B32B 27/30; C08F 2/48; C08F 220/1808; C08F 265/06; C08F 220/1804; C08F 220/1818; C08F 220/20; C08F 226/10; C08F 220/1806; C08F 220/14; C08F 220/06; C08F 230/085; C08G 18/672; C08G 18/792; C08G 18/8025; C09D 175/14; C09D 175/16
  See application file for complete search history.

(56) References Cited

U.S. PATENT DOCUMENTS 5,916,693 A * 6/1999 Van Rheenen ........ C09J 133/08
                                            428/514
2010/0304134 A1  12/2010 Nakano et al.
2011/0059281 A1   3/2011 Wada
2012/0100359 A1   4/2012 Kishioka et al.
2013/0248118 A1*  9/2013 Inui ...................... G02F 1/1335
                                            524/561

FOREIGN PATENT DOCUMENTS

| | | |
|---|---|---|
| CN | 102020942 A | 4/2011 |
| CN | 103129096 A | 6/2013 |
| EP | 3 750 962 A1 | 12/2020 |
| JP | 61-43677 A | 3/1986 |
| JP | 7-294585 A | 11/1995 |
| JP | 9-100448 A | 4/1997 |
| JP | 10-125768 A | 5/1998 |
| JP | 2005-148638 A | 6/2005 |
| JP | 2009-516048 A | 4/2009 |
| JP | 2009-519372 A | 5/2009 |
| JP | 2012-87240 A | 5/2012 |
| JP | 2013-47295 A | 3/2013 |
| JP | 2013-117004 A | 6/2013 |
| JP | 2013-139520 A | 7/2013 |
| JP | 2013-216738 A | 10/2013 |
| JP | 2014-201702 A | 10/2014 |
| JP | 2014-218623 A | 11/2014 |
| JP | 2014-218635 A | 11/2014 |
| JP | 2015-199891 A | 11/2015 |
| TW | 200530680 A | 9/2005 |
| TW | 201726873 A | 8/2017 |
| WO | 85/05734 A1 | 12/1985 |
| WO | 2007058493 A1 | 5/2007 |
| WO | 2007069856 | 6/2007 |
| WO | 2009093577 A1 | 7/2009 |
| WO | 2017/010501 A1 | 1/2017 |
| WO | 2017094474 A1 | 6/2017 |
| WO | WO-2017127239 A1 * | 7/2017 .............. C09J 7/385 |

OTHER PUBLICATIONS

Office Action issued for corresponding Japanese Patent Application No. 2019-012130 on Feb. 13, 2020, along with an English translation.
English Translation of International Preliminary Report on Patentability issued for corresponding International Patent Application No. PCT/JP2019/002795 on Aug. 11, 2020.
Office Action issued for corresponding Taiwanese Patent Application No. 108103780 on Oct. 13, 2020 along with an English translation.
Office Action issued for corresponding Japanese Patent Application No. 2020-147360 mailed on Nov. 12, 2020, along with an English machine translation.
Office Action issued for corresponding Chinese Patent Application No. 201980010970.0 on Nov. 24, 2020, along with an English translation.
International Search Report dated Apr. 9, 2019, in connection with corresponding International Patent Application No. PCT/JP2019/002795.
Search Report issued with an Office Action issued on Mar. 22, 2022, for corresponding Chinese patent application No. 202110323247.7, along with an English translation.
Extended European Search Report issued on Nov. 15, 2021 for corresponding European Patent Application No. 19747345.7.
Office Action issued on Jul. 6, 2022, for corresponding Taiwanese patent application No. 110113956, along with an English translation (12 pages).

* cited by examiner

PRESSURE-SENSITIVE ADHESIVE SHEET AND METHOD FOR PEELING PRESSURE-SENSITIVE ADHESIVE SHEET

CROSS-REFERENCE TO RELATED APPLICATION

The present application is a national stage filing under 35 U.S.C § 371 of PCT application number PCT/JP2019/002795 filed on Jan. 28, 2019 which is based upon and claims the benefit of priorities to Japanese Patent Application No. 2018-018621 filed on Feb. 5, 2018, Japanese Patent Application No. 2018-109385 filed on Jun. 7, 2018, and Japanese Patent Application No. 2018-143420 filed on Jul. 31, 2018 in the Japanese Intellectual Property Office, which are incorporated herein in their entireties by reference.

TECHNICAL FIELD

The present invention relates to a pressure-sensitive adhesive sheet and a method for peeling a pressure-sensitive adhesive sheet.

BACKGROUND ART

In general, pressure sensitive adhesive (PSA) exists as a soft solid (a viscoelastic material) in a room temperature range and has a property to adhere easily to an adherend with some pressure applied. For such a property, PSA has been widely used in various fields as an on-support PSA sheet having a PSA layer on a support or as a support-less PSA sheet free of a support.

CITATION LIST

Patent Literature

[Patent Document 1] Japanese Patent Application Publication No. 2005-148638

SUMMARY OF INVENTION

Technical Problem

Various properties are required of PSA depending on the purposes. Among these properties, some are difficult to simultaneously achieve at a high level such that in improving a certain property, some other property has a tendency to decrease. One example of a set of properties in a trade-off relationship is adhesive strength to adherend and ease of rework. The term "rework" refers to the work of removing a PSA sheet from its adherend and re-applying the sheet in case of inadequate application (improper placement, wrinkling, bubble formation, trapping of foreign material, etc.), in case of finding a defect in the adherend after the PSA sheet is applied, etc. Patent Document 1 discloses a peeling technique carried out in the presence of liquid at the peel interface between a PSA layer and a substrate (adherend) for peeling the PSA sheet from the substrate in a reworkable manner without damaging the substrate. On the other hand, in Patent Document 1, no studies are conducted with respect to how the liquid used for peeling the PSA sheet from the substrate affects the bonding reliability of the PSA sheet when there is no intention of peeling.

An objective of the present invention is thus to provide a PSA sheet that allows easy peeling with an aqueous liquid such as water and has highly reliable water resistance. Another objective of this invention is to provide a method for peeling a PSA sheet.

Solution to Problem

The present description provides a PSA sheet having a PSA layer. The PSA layer includes a layer A forming at least one surface of the PSA layer. The PSA sheet has an adhesive strength N0 (or normal adhesive strength N0, hereinafter) of 2.0 N/10 mm or greater. The normal adhesive strength N0 is measured after one day at room temperature following application of the layer A side to a surface of an alkaline glass plate as an adherend fabricated by a float method (or an alkaline float glass plate adherend, hereinafter). The surface of the adherend has a contact angle of 5° to 10° with distilled water. The PSA sheet has a water-resistant adhesive strength reduction rate of 30% or lower and a water-peel adhesive strength reduction rate of 40% or higher. Here, the water-resistant adhesive strength reduction rate is determined by the next formula $(1-(N1/N0)) \times 100$ based on water-resistant adhesive strength N1 (N/10 mm) and the normal adhesive strength N0 (N/10 mm), wherein N1 is measured after the layer A side is applied to the surface of the alkaline float glass plate adherend having a contact angle of 5° to 10° with distilled water, stored at room temperature for one day, immersed in water for 30 minutes, taken out from the water and then residual water is wiped off. The water-peel adhesive strength reduction rate is determined by the next formula $(1-(N2/N0)) \times 100$ based on water-peel strength N2 (N/10 mm) and the normal adhesive strength N0 (N/10 mm), wherein N2 is measured according to JIS Z0237:2009 "10.4.1 Method 1: 180° Peel Strength to Test Plate" after the layer A side is applied to the surface of the alkaline float glass plate adherend having a contact angle of 5° to 10° with distilled water, stored at room temperature for one day, 20 μL of distilled water is dropped onto the adherend and the distilled water is allowed to enter an interfacial edge between the PSA layer and the adherend; in particular, measured using a tensile tester at a test temperature of 23° C. at a tensile speed of 300 mm/min at a peel angle of 180°.

Because the PSA sheet has a 40% or higher water-peel adhesive strength reduction rate, it can be easily peeled using an aqueous liquid such as water. In addition, despite of such a large decrease in adhesive strength caused by water peel (wet peel), because it has a 30% or lower water-resistant adhesive strength reduction rate, it has excellent water resistance reliability.

This description also provides another PSA sheet having a PSA layer. The PSA layer includes a layer A forming at least one surface of the PSA layer. The PSA sheet has a water-resistant adhesive strength reduction rate of 30% or lower, determined by the next formula $(1-(N1/N0)) \times 100$ based on the water-resistant adhesive strength N1 (N/10 mm) and the normal adhesive strength N0 (N/10 mm), wherein N1 is measured after the layer A side is applied to the surface of the alkaline float glass plate adherend having a contact angle of 5° to 10° with distilled water, stored at room temperature for one day, immersed in water for 30 minutes, taken out from the water and then residual water is wiped off; and the adhesive strength N0 is measured after one day at room temperature following application of the layer A side to the surface of the alkaline glass plate. The PSA sheet shows a dry peel distance of 0.5 mm or less and a water penetration distance of 10 mm or greater in the constant load peel test described later.

The PSA sheet exhibits good holding properties under dry peel conditions and can be easily peeled from an adherend when an aqueous liquid such as water is supplied to the interface between the PSA sheet and the adherend. Despite of such an ability to easily peel off with an aqueous liquid, it has excellent water resistance reliability because it has a 30% or lower water-resistant adhesive strength reduction rate.

In some embodiments, the layer A may be formed from a water-dispersed PSA composition (e.g. an emulsion-based PSA composition). According to such a layer A, the resulting PSA sheet is likely to show a high water peel adhesive strength reduction rate.

In some embodiments, the layer B can be formed from a photocurable PSA composition or a solvent-based PSA composition. According to the PSA layer including such a layer B, the resulting PSA sheet tends to have a low water-resistant adhesive strength reduction rate and a high water-peel adhesive strength reduction rate.

The layer A is preferably water-insoluble and non-water-swellable. The PSA sheet having such a layer A can be favorably peeled from adherend with effective use of a small amount of aqueous liquid. While a reworkable PSA sheet is required to have properties (anti-residue properties) to be peeled off an adherend without leaving PSA residue, with the water-insoluble and non-water-swellable layer A, the PSA forming the layer A is less likely to leave residue on the adherend.

In some embodiments, the layer A may include a hydrophilicity enhancer. According to the layer A including a hydrophilicity enhancer, the resulting PSA sheet is likely to favorably combine water peeling properties and water resistance reliability. For instance, it is possible to favorably bring about a PSA sheet that meets the 30% or lower water-resistant adhesive strength reduction rate and 40% or higher water-peel adhesive strength reduction rate. The use of hydrophilicity enhancer can also favorably bring about, for instance, a PSA sheet that satisfies the 30% or lower water-resistant adhesive strength reduction rate, the dry peel distance of 0.5 mm or less and the water penetration distance of 10 mm or greater. The hydrophilicity enhancer content can be, for instance, about 0.01 part by weight or greater and 20 parts by weight or less per 100 parts by weight of the monomers forming the polymer included in the layer A.

In some embodiments, the layer A can be formed with an acrylic PSA comprising an acrylic polymer. In a preferable acrylic polymer, a (meth)acrylate having a hydrocarbon group with 1 to 20 carbon atoms at the ester terminus accounts for 50% or more of the monomers forming the polymer. The PSA sheet disclosed herein can be favorably made in an embodiment wherein the layer A has such a composition.

The PSA layer may have a thickness of, for instance, 10 µm or greater and 200 µm or less. The PSA layer having such a thickness is likely to bring about both a 30% or lower water-resistant adhesive strength reduction rate and a 40% or higher water-peel adhesive strength reduction rate. The PSA layer having such a thickness is likely to bring about a 30% or lower water resistant adhesive strength reduction rate as well as a dry peel distance of 0.5 mm or less and a water penetration distance of 10 mm or greater.

This description also provides a PSA sheet having a PSA layer. The PSA layer includes a layer A forming at least one surface of the PSA layer. The PSA layer further includes a layer B placed on the backside of the layer A. According to such a PSA layer including layers A and B, for instance, while the layer A provides good water-peeling properties, the layer B allows adjustment of the bulk properties (e.g. water resistance, cohesion, heat resistance, etc.) of the PSA layer. Thus, with the PSA layer having such a constitution, the resulting PSA sheet is likely to favorably combine, for instance, water-peeling properties and water resistance reliability. For instance, it may favorably bring about a PSA sheet having a high water-peel adhesive strength reduction rate and a low water-resistant adhesive strength reduction rate. It may also favorably bring about, for instance, a PSA sheet having a long water penetration distance and a low water-resistant adhesive strength reduction rate. Such a constitution with the PSA layer including layers A and B can be preferably employed, for instance, in an embodiment where the PSA layer has a thickness greater than 50 µm.

In the embodiment with the PSA layer including layers A and B, the layer B is preferably placed in direct contact with the backside of the layer A. The PSA layer having such a constitution may have, for instance, excellent conformability to surface structures (e.g. unevenness) of the adherend as compared to a constitution having a non-adhesive middle layer between the layers A and B. With the PSA sheet having such a PSA layer, the PSA layer easily makes tight contact with the adherend; and therefore, good water resistance is likely to be obtained.

In the embodiment with the PSA layer including layers A and B, the layer B may have a thickness of, for instance, 20 µm or greater. The layer B having such a thickness tends to favorably bring about an advantage of the PSA layer having the layer B on the backside of the layer A.

In the embodiment with the PSA layer including layers A and B, the layer A may have a thickness of, for instance, 5 µm or greater and 50 µm or less. With the layer A having such a thickness, the resulting PSA sheet is likely to favorably combine water-peeling properties and water resistance reliability. For instance, it is likely to bring about a PSA sheet having a low water resistant adhesive strength reduction rate and a high water-peel adhesive strength reduction rate (and/or a long water penetration distance).

This description provides a PSA sheet-bearing member comprising any of a PSA sheet disclosed herein, and a member bonded to the one surface (i.e. the A layer side, also referred to as a first surface hereinafter) of the PSA layer. Such a PSA sheet-bearing member may show, for instance, good reworkability when applying the PSA sheet to the member. For instance, in an event of a defect such as trapping of foreign material during the application, the PSA sheet can be easily peeled from the member using an aqueous liquid such as water and applied again. The PSA sheet-bearing member may show good reworkability with such use of aqueous liquid as well as good water resistance reliability.

This description provides a method for peeling a PSA sheet adhered on an adherend from the adherend. The method may include a water-peel step in which the PSA sheet is peeled from the adherend, in a state where an aqueous liquid exits at the interface between the adherend and the PSA sheet at the front line of peeling the PSA sheet from the adherend, with the aqueous liquid allowed to further enter the interface following the movement of the peel front line. Here, the peel front line refers to where the PSA sheet starts to separate from the adherend when peeling of the PSA sheet from the adherend is allowed to proceed. According to the water peel step, the PSA sheet can be peeled from the adherend with effective use of the aqueous liquid. The PSA sheet peeled by applying the peeling method disclosed herein typically includes a PSA layer. The PSA sheet can be, for instance, any of a PSA sheet disclosed herein. In some embodiments, at least the adherend side surface of the PSA layer is formed with the layer A, preferably comprising a hydrophilicity enhancer.

The peeling method can be preferably practiced in an embodiment where the peel front line is allowed to move at a speed of 10 mm/min or higher. According to such an embodiment, the PSA sheet can be efficiently peeled from the adherend.

DESCRIPTION OF EMBODIMENTS

Figure 1:
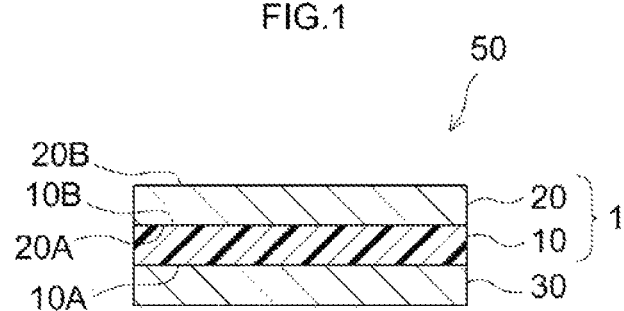
FIG. 1 shows a cross-sectional diagram schematically illustrating the PSA sheet according to an embodiment.

Preferable embodiments of the present invention are described below. Matters necessary to practice this invention other than those specifically referred to in this Description can be understood by a person skilled in the art based on the disclosure about implementing the invention in this Description and common technical knowledge at the time the application was filed. The present invention can be practiced based on the contents disclosed in this Description and common technical knowledge in the subject field. In the following drawings, components or units having the same functions may be described with the same symbols allocated and the redundant description may be omitted or simplified. The embodiments illustrated in the drawings are schematic in order to clearly describe the present invention and the drawings do not accurately represent the size or scale of products actually provided.

As used herein, the term "acrylic polymer" refers to a polymer derived from a starting monomer mixture including more than 50% acrylic monomer by weight. The acrylic monomer refers to a monomer having at least one (meth) acryloyl group per molecule. As used herein, the term "(meth)acryloyl" comprehensively refers to acryloyl and methacryloyl. Similarly, the term "(meth)acrylate" comprehensively refers to acrylate and methacrylate, and the term "(meth)acryl" comprehensively refers to acryl and methacryl.

Examples of Constitution of PSA Sheet

FIG. 1 shows an example of the constitution of the PSA sheet disclosed herein. PSA sheet 1 is formed as an adhesively single-faced PSA sheet comprising a PSA layer 10 whose first surface 10A is an adhesion face to adherend, and a support 20 laminated on the second surface 10B of PSA layer 10. PSA layer 10 is permanently bonded to a first face 20A of support 20. As support 20, for instance, plastic film such as polyester film can be used. In the example shown in FIG. 1, PSA layer 10 has a monolayer structure. In other words, the entire PSA layer 10 is formed of the layer A forming the first surface (adhesive face) 10A of PSA layer 10. PSA sheet 1 prior to use (before applied to adherend) may have, for instance as shown in FIG. 1, a form of release-linered PSA sheet 50 in which adhesive face 10A is protected with release liner 30 having a releasable surface (release face) at least on the PSA layer side. Alternatively, it may have a form where the second face 20B (the reverse side of the first face 20A, or the backside) of support 20 is a release face and adhesive face 10A is protected, wound or layered with the second face 20B in contact with adhesive face 10A.

As for the release liner, no particular limitations are imposed. For example, it is possible to use a release liner in which a surface of a liner substrate such as resin film or paper is release-treated, or a release liner formed from a low adhesive material such as fluorine-based polymer (polytetrafluoroethylene, etc.) and polyolefin-based resin (polyethylene, polypropylene, etc.). For the release treatment, for instance, a release agent such as silicone-based and long-chain alkyl-based release agents can be used. In some embodiments, release-treated resin film can be preferably used as the release liner.

Figure 2:
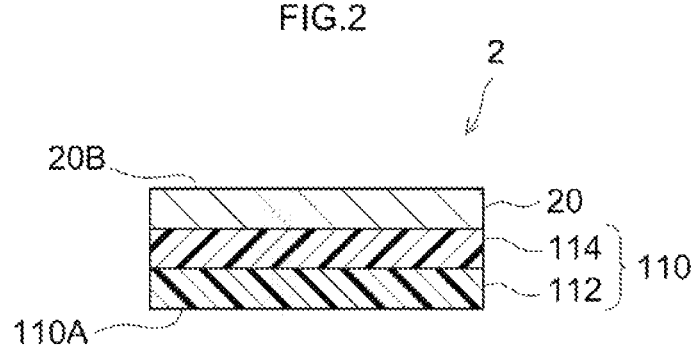
FIG. 2 shows a cross-sectional diagram schematically illustrating the PSA sheet according to another embodiment.

FIG. 2 shows another example of the constitution of the PSA sheet disclosed herein. PSA sheet 2 is formed as an adhesively single-faced PSA sheet comprising a PSA layer 110 whose first face 110A is an adhesion face to adherend, and a support 20 laminated on the second face of PSA layer 110. PSA layer 110 has a two-layer structure formed of a layer A 112 forming first face (adhesive face) 110A, and a layer B 114 laminated on the backside of layer A 112. Similar to PSA sheet 1 shown in FIG. 1, PSA sheet 2 prior to use (before applied to adherend) may have a form of release-linered PSA sheet in which adhesive face 110A is protected with a release liner not shown in the drawing. Alternatively, it may in an embodiment where the second face 20B of support 20 is a release face and the PSA sheet is wound or layered so that adhesive face 110A is in contact with and protected with second face 20B.

The PSA sheet disclosed herein may have a form of support-less double-faced PSA sheet formed of a PSA layer. Such a support-less double-faced PSA sheet can be used, for instance, by bonding a support to the second face of the PSA layer.

Figure 3:
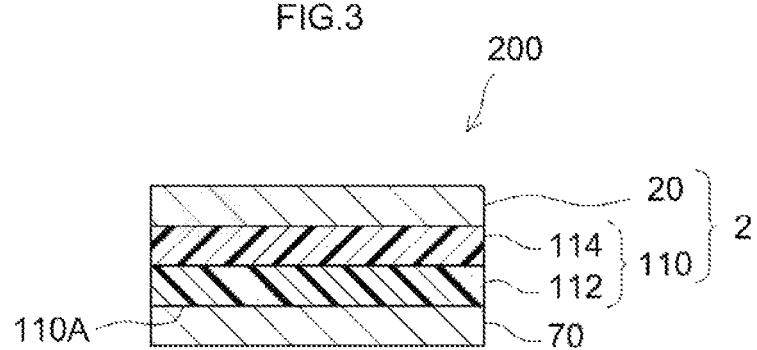
FIG. 3 shows a cross-sectional diagram schematically illustrating a PSA sheet-bearing member wherein the PSA sheet according to another embodiment is adhered to a member.

The PSA sheet disclosed herein can be a component of a PSA sheet-bearing member in which the member is bonded to the PSA layer's first surface (i.e. the layer A side surface). For instance, as shown in FIG. 3, PSA sheet 2 shown in FIG. 2 can be a component of a PSA sheet-bearing member 200 in which a member 70 is bonded to the first face 110A of PSA layer 110. In place of PSA sheet 2 shown in FIG. 2, PSA sheet 1 shown in FIG. 1 can also be used. The surface of the member where the PSA sheet is applied is preferably a non-water-absorbing smooth surface. With such a constitution, when applying a PSA sheet to a member to form a PSA sheet-bearing member, the PSA sheet can be easily reworked applying the water peel method described later as necessary. The member can be, for instance, a glass substrate, resin film, a metal plate, etc. Favorable examples of the member include optical parts described later. Of the member, the face applied to the PSA sheet may be subjected to hydrophilicity enhancing treatment. Examples of the hydrophilicity enhancing treatment include treatment that contributes to an increase in hydrophilicity, such as corona treatment, plasma treatment, and hydrophilic coating by which a hydrophilic coating layer is provided.

<Properties of PSA Sheet>

The PSA sheet provided by this Description has a water-resistant adhesive strength reduction rate of 30% or lower.

In a preferable embodiment, the PSA sheet has a water-peel adhesive strength reduction rate of 40% or higher. This description provides a PSA sheet having a water-resistant adhesive strength reduction rate of 30% or lower and a water-peel adhesive strength reduction rate of 40% or higher.

In another preferable embodiment, the PSA sheet has a dry peel distance of 0.5 mm or greater and a water penetration distance of 10 mm or greater. This description provides a PSA sheet having a 30% or lower water-resistant adhesive strength reduction rate, a dry peel distance of 0.5 mm or less, and a water penetration distance of 10 mm or greater.

The water-resistant adhesive strength reduction rate (%) is defined as a value determined from its normal adhesive strength N0 (N/10 mm) and water-resistant adhesive strength N1 (N/10 mm) according to $(1-(N1/N0))\times 100$. The water-peel adhesive strength reduction rate is defined as a value determined from its normal adhesive strength N0 (N/10 mm) and water-peel strength N2 according to $(1-(N2/N0))\times 100$. Normal adhesive strength N0, water-resistant adhesive strength N1 and water-peel strength N2 are determined by the methods described earlier, in particular, by the methods shown below. The same measurement methods are used in the Examples described later.

[Determination of Normal Adhesive Strength N0]

A PSA sheet subject to measurement is cut to a 10 mm wide 120 mm long rectangular shape to prepare a test piece. The layer A side of the test piece is adhered to an adherend with a hand-held roller to obtain a test sample. The test sample is placed in an autoclave and treated at a pressure of 5 atm and a temperature of 50° C. for 15 minutes.

The test sample is removed from the autoclave and stored in an environment at 23° C. and 50% RH for one day. Subsequently, in the same environment, a cutting knife is inserted into the interface between the test piece and the adherend to separate one end of the length direction of the test piece from the adherend; and the peel strength is determined according to "10.4.1 Method 1: 180° Peel Strength to Test Plate" in JIS Z0237:2009," in particular, using a tensile tester at a test temperature of 23° C., a tensile speed of 300 mm/min and a peel angle of 180°.

[Determination of Water Resistant Adhesive Strength N1]

A PSA sheet subject to measurement is cut to a 10 mm wide 120 mm long rectangular shape to prepare a test piece. The layer A side of the test piece is adhered to an adherend with a hand-held roller to obtain a test sample. The test sample is placed in an autoclave and treated at a pressure of 5 atm and a temperature of 50° C. for 15 minutes.

The test sample is removed from the autoclave, stored in an environment at 23° ° C. and 50% RH for one day, and then immersed in water at room temperature (23° C. to 25° C.) for 30 minutes. As the water, ion exchange water or distilled water is used. In the water, the test sample is horizontally held with the test piece-bearing side up. The distance (immersion depth) from the top face of the test sample to the water surface should be 10 mm or greater (e.g. about 10 mm to 100 mm). Subsequently, the test sample is taken out from the water and any residual water on the test sample is gently wiped off. A cutting knife is then inserted into the interface between the test piece and the adherend to separate one end of the length direction of the test piece from the adherend; and in an environment at 23° C. and 50% RH, the peel strength is determined according to "10.4.1 Method 1: 180° Peel Strength to Test Plate" in JIS Z0237:2009," in particular, using a tensile tester at a test temperature of 23° C., a tensile speed of 300 mm/min and a peel angle of 180°. After taken out from the water, the test sample should be subjected to peel strength measurement within 10 minutes.

[Determination of Water-Peel Strength N2]

A PSA sheet subject to measurement is cut to a 10 mm wide 120 mm long rectangular shape to prepare a test piece. The layer A side of the test piece is adhered to an adherend with a hand-held roller to obtain a test sample. The test sample is placed in an autoclave and treated at a pressure of 5 atm and a temperature of 50° C. for 15 minutes.

The test sample is removed from the autoclave and stored in an environment at 23° ° C. and 50% RH for one day. Subsequently, in the same environment, near one end of the length direction of the test piece, 20 μL of distilled water is dropped onto the adherend surface exposed off the one end. A cutting knife is then inserted into the interface between the test piece and the adherend to allow the water to enter the interface. After this, the peel strength is determined according to "10.4.1 Method 1: 180° Peel Strength to Test Plate" in JIS Z0237:2009," in particular, using a tensile tester at a test temperature of 23° C., a tensile speed of 300 mm/min and a peel angle of 180°. It is noted that the water used in measurement of water-peel strength N2 is only the 20 μL of distilled water dropped onto the adherend before the start of peeling.

The dry peel distance and the water penetration distance are determined by the constant load peel test described below. The same measurement method is used in the Examples described later.

[Constant Load Peel Test]

A PSA sheet subject to measurement is cut to a 10 mm wide 150 mm long rectangular shape to prepare a test piece. To a surface of an alkaline float glass plate adherend having a contact angle of 5° to 10° with distilled water, the layer A side of the test piece is adhered with a hand-held roller to obtain a test sample. The test sample is placed in an autoclave and treated at a pressure of 5 atm and a temperature of 50° C. for 15 minutes. The test sample is removed from the autoclave and stored in an environment at 23° C. and 50% RH for one day. Subsequently, in the same environment, from one end of the length direction of the test piece to 50 mm is peeled from the adherend to make a free end and the adherend is horizontally fixed with the test piece-bearing side down and open. Subsequently, a 100 g weight is fixed to the free end of the test piece and at one minute after the weight is fixed, 20 μL of distilled water is supplied to the interface between the test piece and the adherend. The distance over which the test piece is peeled off the adherend in one minute from zero second after (immediately after) the weight is fixed to the free end is determined as the dry peel distance. The distance over which peeling has progressed in 10 seconds from zero second after the supply of distilled water to the interface is determined as the water penetration distance.

Figure 4:
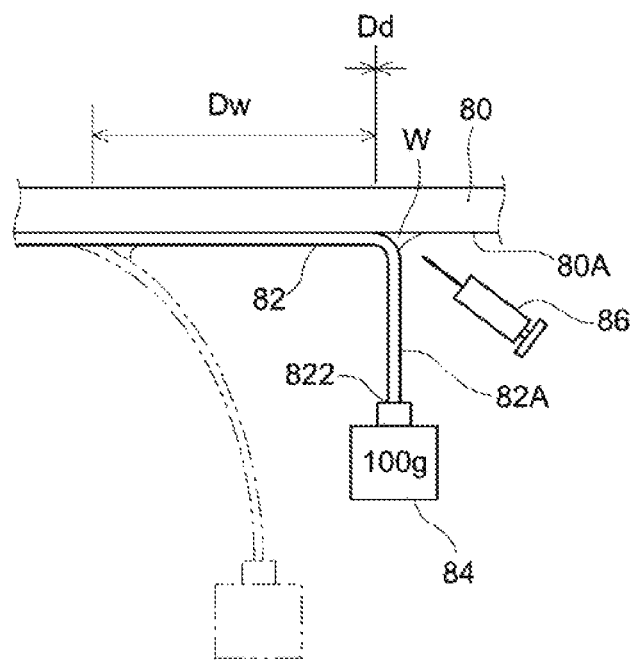
FIG. 4 shows a schematic diagram illustrating the method for measuring dry peel distance and water penetration distance.

FIG. 4 shows a diagram schematically illustrating the method for measuring the dry peel distance and the water penetration distance. As described above, to surface 80A of an alkaline float glass plate (adherend) 80 having a contact angle of 5° to 10° with distilled water, the layer A side of test piece 82 (i.e. adhesive face 82A) is adhered to obtain a test sample. After this was treated in an autoclave, alkaline glass plate 80 is horizontally held with surface 80A down. From one end 822 of test piece 82 to 50 mm is peeled from alkaline glass plate 80 to make a free end and a 100 g weight 84 is fixed thereto. The distance over which test piece 82 is peeled off alkaline glass plate 80 in one minute from zero second after the weight is fixed is determined as the dry peel distance Dd (mm). When peeling does not progress in the one minute, the dry peel distance Dd is 0 mm. At one minute after weight 84 is fixed to end 822 of test piece 82, 20 μL of distilled water is supplied to the interface between test piece 82 and alkaline glass plate 80, using, for instance, a microsyringe 86. Distilled water W is desirably supplied to the center of the width of test piece 82 at the interface (i.e. where adhesive face 82A starts to separate from surface 80A). The distance over which peeling has progressed in 10 seconds from zero second after the supply of distilled water W to the interface is determined as water penetration distance Dw (mm). It is noted that in FIG. 4, the solid line shows the state at 0 second after the supply of distilled water W to the interface and the imaginary line (dashed double-dotted line) shows the state at 10 seconds after the supply of distilled water W.

In the measurement of normal adhesive strength N0, water-resistant adhesive strength N1 and water-peel strength N2 as well as in the measurement of dry peel distance and water penetration distance, the adherend used is an alkaline glass plate fabricated by a float method with a surface (to which the test piece is adhered) having a contact angle of 5° to 10° with distilled water. For instance, as the adherend, an alkaline glass plate (1.35 mm thick, blue slide glass with polished edges) available from Matsunami Glass Ind., Ltd., or a comparable product can be used. The test piece is adhered to the adherend so that the distance from a peripheral edge of the test piece to a peripheral edge of the adherend is at least 10 mm or greater, or preferably 15 mm or greater. In the PSA sheet including a photo-crosslinkable PSA layer, the sample removed from the autoclave is subjected via the alkaline glass plate to photoirradiation in an environment at 23° C. and 50% RH and the peel strength is determined after this. Photoirradiation conditions (wavelength, intensity of radiation, irradiation time, etc.) can be suitably selected in accordance with the PSA layer's composition, thickness, etc. As the tensile tester, a universal tensile/compression testing machine (machine name "tensile and compression testing machine, TCM-1kNB" available from Minebea Co., Ltd.) or a comparable product can be used. The measurement of peel strength is carried out so that peeling of the test piece adhered to the adherend proceeds upward from the bottom. For the measurement, a suitable backing material can be applied to the backside (the reverse side of the layer A surface) as necessary to reinforce the test piece. As the backing material, for example, an about 25 μm thick polyethylene terephthalate film can be used.

The contact angle of the alkaline glass plate is determined as follows: In an environment at 23° C. and 50% RH (measurement atmosphere), measurement is carried by a drop method, using a contact angle meter (available from Kyowa Interface Science Co., Ltd.; product name DMo-501, control box DMC-2, control/analysis software FAMAS (version 5.0.30)). The amount of distilled water dropped is 2 μL. From an image taken at 5 seconds after distilled water is dropped, the contact angle is determined by the Θ/2 method (conducted 5 times).

(Water-Peel Adhesive Strength Reduction Rate)

The PSA disclosed herein preferably has a water-peel adhesive strength reduction rate of 40% or higher. A PSA sheet having a large water-peel adhesive strength reduction rate can be easily peeled using an aqueous liquid such as water. For instance, supply a small amount of aqueous liquid to the adherend with the PSA sheet adhered thereto, allow the aqueous liquid to enter the interface between the PSA sheet and the adherend at one edge of the PSA sheet to provide a trigger for peeling, and then peel the PSA sheet. By this, the peel strength of the PSA sheet to the adherend can be greatly reduced. This property helps combine high adhesive strength and good reworkability for normal use. In some embodiments, the water-peel adhesive strength reduction rate may be, for instance, 50% or higher, 65% or higher, 75% or higher, 85% or higher, 90% or higher, 95% or higher, or even 97% or higher. The water-peel adhesive strength reduction rate is theoretically 100% or lower and typically below 100%.

(Dry Peel Distance and Water Penetration Distance)

The PSA sheet disclosed herein preferably satisfies a dry peeling distance of 0.5 mm or less and a water entry distance of 10 mm or greater. Such a PSA sheet does not peel easily under conditions free of liquid water at the interface between the PSA sheet's PSA layer and the adherend (i.e. under dry peel conditions) even when a force is applied in a peeling direction of the PSA sheet from the adherend, showing good holding properties; and therefore, it provides excellent bonding reliability. On the other hand, the PSA sheet can be easily peeled from the adherend by supplying an aqueous liquid such as water to the interface between the PSA sheet and the adherend. This is preferable from the standpoint of the reworkability and recyclability.

In some embodiments, the dry peel distance may be, for instance, 0.4 mm or less, 0.3 mm or less, 0.2 mm or less, 0.1 mm or less, or even less than 0.1 mm. In general, the shorter the dry peel distance is, the more preferable it is. It is particularly preferably essentially 0 mm. Here, being "essentially 0 mm" means that no progress of peeling is observed in one minute from 0 second after a weight is applied to the free end of the test piece. However, in view of the balance with other properties, the PSA sheet disclosed herein can be favorably implemented, for instance, in an embodiment where the dry peel distance is greater than 0.1 mm, or greater than 0.2 mm.

In some embodiments, the water penetration distance may be, for instance, 14 mm or greater, 18 mm or greater, or even 20 mm or greater. From the standpoint of improving the water-peeling properties of the PSA sheet, the longer the water penetration distance is, the more preferable it is. In the constant load peel test, at the time of supply of distilled water to the interface between the test piece and the adherend, the water penetration distance never exceeds the length of the test piece portion bonded to the adherend. For instance, when a 150 mm long test piece is used and from one end of the test piece to 50 mm is peeled from the adherend to form a free end to which the weight is applied, while it may vary depending on the dry peel distance, for instance, in a case where the dry peel distance is 0 mm, the maximum water penetration distance is 100 mm. When the peeling proceeds to the opposite end of the test piece within 10 seconds after distilled water is supplied and the test piece falls off the adherend, while it may vary depending on the dry peel distance, for instance, in a case where the dry peel distance is 0 mm, the water penetration distance can be assessed to be greater than 100 mm.

(Water-Resistant Adhesive Strength Reduction Rate)

Despite that the PSA sheet disclosed herein can be easily peeled using an aqueous liquid such as water as described above, because the water-resistant adhesive strength reduction rate is 30% or lower, it provides excellent water resistance reliability. From the standpoint of obtaining greater water resistance reliability, the water-resistant adhesive strength reduction rate is preferably, for instance, 20% or lower, more preferably 10% or lower, or possibly 7% or lower. The water-resistant adhesive strength reduction rate is typically 0% or higher. The PSA sheet disclosed herein can be preferably made in an embodiment where the difference between the water-peel adhesive strength reduction rate (%) and the water-resistant adhesive strength reduction rate (%)

is, for instance, 45% or greater, 55% or greater, or 70% or greater, 80% or greater, or 90% or greater.

From the standpoint of the bonding reliability, the PSA sheet disclosed herein preferably has a normal adhesive strength N0 of 2.0 N/10 mm or greater. In some embodiments, the normal adhesive strength N0 can be, for instance, 2.5 N/10 mm or greater, 3.0 N/10 mm or greater, 3.5 N/10 mm or greater, or even 4.0 N/10 mm or greater. The maximum normal adhesive strength N0 is not particularly limited. For instance, it can be 30 N/10 mm or less. In some embodiments, the normal adhesive strength N0 can be 20 N/10 mm or less, or even 15 N/10 mm or less.

The water peel strength N2 is preferably up to 60% (more preferably up to 50%) of the normal adhesive strength N0. While no particular limitations are imposed, the water-peel strength N2 can be, for instance, 10 N/10 mm or less, 3.5 N/10 mm or less, 3.0 N/10 mm or less, 2.5 N/10 mm or less, 1.6 N/10 mm or less, 1.2 N/10 mm or less, or even 1.0 N/10 mm or less. According to the PSA sheet having a low water-peel strength N2, it is possible to reduce the load applied to the adherend when peeling the PSA sheet. This is particularly significant in the PSA sheet applied to, for instance, a thin adherend, a brittle adherend, an adherend susceptible to deformation (elongating, warping, twisting, etc.), an adherend having a thin surface layer susceptible to damage, and the like. The PSA sheet disclosed herein can be also made in an embodiment where the water-peel strength N2 is, for instance, 0.75 N/10 mm or less, 0.50 N/10 mm or less, 0.25 N/10 mm or less, or even 0.15 N/10 mm or less. The minimum water-peel strength N2 is not particularly limited. It can be essentially 0 N/10 mm, or greater than 0 N/10 mm.

From the standpoint of enhancing the reworkability, in the measurement of water-peel strength N2, it is preferable that the PSA sheet peels from the adherend without leaving the PSA on the adherend. That is, the PSA sheet preferably has excellent anti-residue properties. The presence or absence of residual PSA left on the adherend can be determined, for instance, by visually observing the adherend after the PSA sheet is peeled.

The ratio (N2/N0) of the water-peel strength N2 (N/10 mm) to the normal adhesive strength N0 (N/10 mm) can be, for instance, 1/2.5 or less, 1/5 or less, or even 1/10 or less. A smaller N2/N0 ratio means a more significant decrease in water-peel strength N2 relative to the normal adhesive strength N0. The PSA sheet disclosed herein can be preferably made in an embodiment in which the N2/N0 ratio is 1/15 or less, 1/25 or less, or 1/35 or less. The maximum N2/N0 ratio value is not particularly limited. For instance, it can be 1/200 or greater, 1/150 or greater, or even 1/100 or greater.

In the PSA sheet disclosed herein, the PSA that forms the layer A constituting at least one face of the PSA layer is preferably water-insoluble. According to the water-insoluble layer A, the resulting PSA sheet is likely to have a high water-resistant adhesive strength N1 and a low water-resistant adhesive strength reduction rate. The water-insoluble layer A is also preferable from the standpoint of preventing leftover PSA on the adherend during the peel using an aqueous liquid such as water. In addition, the water-insoluble layer A can also be advantageous from the standpoint of preventing the transparency of the PSA sheet from decreasing due to water immersion or the surrounding moisture.

In the PSA sheet disclosed herein, the PSA forming the layer A is preferably non-water-swellable. According to the non-water-swellable layer A, the resulting PSA sheet is likely to have a high water-resistant adhesive strength N1 and a low water-resistant adhesive strength reduction rate. It can also exhibit good peeling properties with effective use of a small amount of aqueous liquid. The non-water-swellable layer A is also preferable from the standpoint of preventing leftover PSA on the adherend during the peel using an aqueous liquid. In addition, the non-water-swellable layer A can also be advantageous from the standpoint of preventing the transparency of the PSA sheet from decreasing due to water immersion or the surrounding moisture.

Here, in this Description, PSA being water-insoluble means that it has a 75% or higher gel fraction, determined by the method described below. PSA being non-water-swellable means that it has a degree of swelling of 2 or less, determined by the method described below.

Specifically, about 0.5 g of a PSA subject to measurement is weighed, and its weight is defined as W1. This PSA is immersed in 500 mL of distilled water at room temperature (about 23° C.) for 48 hours, filtered through a nylon mesh, and the weight W2 of the water-containing PSA is measured. Subsequently, the PSA is allowed to dry at 130° C. for 5 hours and the weight W3 of non-volatiles is measured. The gel fraction and the degree of swelling are calculated by the following equations:

$$\text{Gel fraction (\%)} = (W3/W1) \times 100$$

$$\text{Degree of swelling} = W2/W1$$

In some embodiments, the layer A may have a gel fraction of, for instance, 80% or higher, 90% or higher, 95% or higher, or even 98% or higher. The gel fraction of the layer A is theoretically 100% or lower. In some embodiments, the degree of swelling of the layer A can be, for instance, 1.7 or less, 1.5 or less, or even 1.2 or less. The degree of swelling of the layer A is usually 1.0 or greater, and typically above 1.0.

In the PSA sheet in an embodiment where the PSA layer includes a layer A and a layer B placed on the backside of the layer A, the gel fraction of the layer B is not particularly limited. In some embodiments, the B layer preferably has a gel fraction equal to or higher than the gel fraction of the A layer, or possibly above the gel fraction of the A layer. The gel fraction of the B layer can be, for instance, 90% or higher, 95% or higher, 98% or higher, or 99% or higher. The gel fraction of the B layer is theoretically 100% or lower. The gel fraction of the entire PSA layer can be, for instance, 85% or higher, 90% or higher, 95% or higher, 98% or higher, or even 99% or higher. In the PSA layer consisting of the layer A, the gel fraction of the entire PSA layer means the gel fraction of the layer A.

In the PSA sheet in an embodiment where the PSA layer includes a layer A and a layer B placed on the backside of the layer A, the degree of swelling of the layer B is not particularly limited. In some embodiments, the degree of swelling of the B layer is preferably equal to or less than the degree of swelling of the layer A, or possibly below the degree of swelling of the layer A. The degree of swelling of the B layer can be, for instance, 1.5 or less, 1.3 or less, or even 1.1 or less. The degree of swelling of the layer B is usually 1.0 or greater, and typically above 1.0. The degree of swelling of the entire PSA layer can be, for instance, 1.6 or less, 1.4 or less, 1.2 or less, or even 1.1 or less. In the PSA layer consisting of the layer A, the degree of swelling of the entire PSA layer means the degree of swelling of the layer A.

The PSA's gel fraction and degree of swelling relative to water can be adjusted by suitably employing techniques generally known by those skilled in the art at the time of filing this application, such as the monomer composition, the polymer's weight average molecular weight, and the use of crosslinking agent or a polyfunctional monomer.

<PSA Layer>

(1) Layer A

In the PSA sheet disclosed herein, the layer A forming at least one surface of the PSA layer may be, for instance, a PSA layer formed comprising one, two or more species of PSA selected among various kinds of known PSA such as acrylic PSA, rubber-based PSA (based on natural rubber, synthetic rubber, a mixture of these, etc.), silicone-based PSA, polyester-based PSA, urethane-based PSA, polyether-based PSA, polyamide-based PSA, and fluorine-based PSA. Here, the acrylic PSA refers to a PSA whose primary component is an acrylic polymer. The same applies to the rubber-based PSA and other PSA. It is noted that the concept of polymer here encompasses polymer having a relatively low degree of polymerization, which is sometimes called oligomer in general.

(Acrylic PSA)

From the standpoint of the transparency, weatherability, etc., in some embodiments, as the material forming the layer A, acrylic PSA can be preferably used.

For instance, a preferable acrylic PSA comprises an acrylic polymer formed from monomers including more than 50% by weight alkyl (meth)acrylate having, at the ester terminus, a linear or branched alkyl group with 1 up to 20 carbon atoms. Hereinafter, an alkyl (meth)acrylate having, at the ester terminus, an alkyl group with X up to Y number of carbon atoms may be referred to as an "Cry alkyl (meth)acrylate." For easy balancing of properties, the ratio of $C_{1-20}$ alkyl (meth)acrylate in the entire monomers (all monomers) can be, for instance, 55% by weight or higher, 60% by weight or higher, or even 70% by weight or higher. For the same reason, of the entire monomers, the ratio of $C_{1-20}$ alkyl (meth)acrylate can be, for instance, 99.9% by weight or less, 99.5% by weight or less, or even 99% by weight or less.

Non-limiting specific examples of the $C_{1-20}$ alkyl (meth)acrylate include methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth) acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth) acrylate, tridecyl (meth)acrylate, tetradecyl (meth)acrylate, pentadecyl (meth)acrylate, hexadecyl (meth)acrylate, heptadecyl (meth)acrylate, stearyl (meth)acrylate, isostearyl (meth)acrylate, nonadecyl (meth)acrylate, and eicosyl (meth)acrylate.

Among these, it is preferable to use at least a $C_{4-20}$ alkyl (meth)acrylate and it is more preferable to use at least a $C_{4-18}$ alkyl (meth)acrylate. For example, as the monomer(s), an acrylic PSA including one or each of n-butyl acrylate (BA) and 2-ethylhexyl acrylate (2EHA) is preferable and an acrylic PSA including at least 2EHA is particularly preferable. Other examples of $C_{4-20}$ alkyl (meth)acrylates that are preferably used include isononyl acrylate, n-butyl methacrylate (BMA), 2-ethylhexyl methacrylate (2EHMA), and isostearyl acrylate (ISTA).

In some embodiments, the monomers forming the acrylic polymer may include 40% (by weight) or more $C_{4-18}$ alkyl (meth)acrylate. According to such monomers including a relatively large amount of alkyl (meth)acrylate having an alkyl group with 4 or more carbon atoms at the ester terminus, a highly lipophilic acrylic polymer tends to be formed. The highly lipophilic acrylic polymer is likely to form a PSA layer having a low water-resistant adhesive strength reduction rate. The ratio of $C_{4-18}$ alkyl (meth)acrylate in the monomers can be, for instance, 60% by weight or higher, 70% by weight or higher, 75% by weight or higher, or even 80% by weight or higher. The monomers may include a $C_{6-18}$ alkyl (meth)acrylate up to an aforementioned minimum value (percentage). From the standpoint of enhancing the cohesion of the PSA layer to prevent cohesive failure, the ratio of $C_{4-18}$ alkyl (meth)acrylate in the monomers is usually suitably 99.5% by weight or lower; it can be 99% by weight or lower, 98% by weight or lower, or even 97% by weight or lower. The monomers may include $C_{6-18}$ alkyl (meth)acrylate(s) up to an upper limit shown above.

In addition to the alkyl (meth)acrylate, the monomers forming the acrylic polymer may include, as necessary, another monomer (copolymerizable monomer) that is able to copolymerize with the alkyl (meth)acrylate. As the copolymerizable monomer, a monomer having a polar group (such as a carboxy group, a hydroxy group and a nitrogen atom-containing ring) may be suitably used. The monomer having a polar group may be useful for introducing a cross-linking point into the acrylic polymer or increasing cohesive strength of the PSA. For the copolymerizable monomer, solely one species or a combination of two or more species can be used.

Non-limiting specific examples of the copolymerizable monomer include those indicated below.

Carboxy group-containing monomers: for example, acrylic acid, methacrylic acid, carboxyethyl acrylate, carboxypentyl acrylate, itaconic acid, maleic acid, fumaric acid, crotonic acid and isocrotonic acid;

Acid anhydride group-containing monomers: for example, maleic anhydride and itaconic anhydride;

Hydroxy group-containing monomers: for example, hydroxyalkyl (meth)acrylates such as 2-hydroxyethyl (meth)acrylate, 2-hydroxypropyl (meth)acrylate, 2-hydroxybutyl (meth)acrylate, 3-hydroxypropyl (meth)acrylate, 4-hydroxybutyl (meth)acrylate, 6-hydroxyhexyl (meth) acrylate, 8-hydroxyoctyl (meth)acrylate, 10-hydroxydecyl (meth)acrylate, 12-hydroxyauryl (meth)acrylate and (4-hydroxymethylcyclohexyl)methyl (meth)acrylate;

Monomers having a sulphonate group or a phosphate group: for example, styrene sulphonic acid, allyl sulphonic acid, sodium vinylsulphonate, 2-(meth)acrylamide-2-methylpropane sulphonic acid, (meth)acrylamide propane sulphonic acid, sulphopropyl (meth)acrylate, (meth)acryloyloxy naphthalenesulphonic acid and 2-hydroxyethylacryloyl phosphate;

Epoxy group-containing monomers: for example, epoxy group-containing acrylates such as glycidyl (meth)acrylate and (meth)acrylate-2-ethyl glycidyl ether, allyl glycidyl ether and (meth)acrylate glycidyl ether;

Cyano group-containing monomers: for example, acrylonitrile and methacrylonitrile;

Isocyanato group-containing monomers: for example, 2-isocyanatoethyl (meth)acrylate;

Amido group-containing monomers: for example, (meth) acrylamide; N,N-dialkyl (meth)acrylamides such as N,N-dimethyl(meth)acrylamide, N,N-diethyl(meth)acrylamide, N,N-dipropyl(meth)acrylamide, N,N-diisopropyl(meth) acrylamide, N,N-di(n-butyl)(meth)acrylamide and N,N-di(t-butyl) (meth)acrylamide; N-alkyl (meth)acrylamides such as N-ethyl(meth)acrylamide, N-isopropyl(meth)acrylamide, N-butyl(meth)acrylamide and N-n-butyl(meth)acrylamide;

N-vinylcarboxylic acid amides such as N-vinylacetamide; a monomer having a hydroxy group and an amide group, for example, an N-hydroxyalkyl(meth)acrylamide such as N-(2-hydroxyethyl)(meth)acrylamide, N-(2-hydroxypropyl)(meth)acrylamide, N-(1-hydroxypropyl)(meth)acrylamide, N-(3-hydroxypropyl)(meth)acrylamide, N-(2-hydroxybutyl)(meth)acrylamide, N-(3-hydroxybutyl)(meth)acrylamide, and N-(4-hydroxybutyl)(meth)acrylamide; a monomer having an alkoxy group and an amide group, for example, an N-alkoxyalkyl(meth)acrylamide such as N-methoxymethyl(meth)acrylamide, N-methoxyethyl(meth)acrylamide, and N-butoxymethyl(meth)acrylamide; and N,N-dimethylaminopropyl(meth)acrylamide, N-(meth)acryloylmorpholine, etc.

Amino group-containing monomers: for example, aminoethyl (meth)acrylate, N,N-dimethylaminoethyl (meth)acrylate and t-butylaminoethyl (meth)acrylate.

Epoxy group-containing monomers: for example, glycidyl (meth)acrylate, methylglycidyl (meth)acrylate, and allyl glycidyl ether.

Monomers having a nitrogen atom-containing ring: for example, N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-(meth)acryloyl-2-pyrrolidone, N-(meth)acryloylpiperidine, N-(meth)acryloylpyrrolidine, N-vinylmorpholine, N-vinyl-3-morpholinone, N-vinyl-2-caprolactam, N-vinyl-1,3-oxazin-2-one, N-vinyl-3,5-morpholinedione, N-vinylpyrazole, N-vinylisoxazole, N-vinylthiazole, N-vinylisothiazole and N-vinylpyridazine (such as lactams including N-vinyl-2-caprolactam);

Monomers having a succinimide backbone: for example, N-(meth)acryloyloxy methylene succinimide, N-(meth)acryloyl-6-oxy hexamethylene succinimide and N-(meth)acryloyl-8-oxy hexamethylene succinimide;

Maleimides: for example, N-cyclohexylmaleimide, N-isopropylmaleimide, N-laurylmaleimide and N-phenylmaleimide;

Itaconimides: for example, N-methyl itaconimide, N-ethyl itaconimide, N-butyl itaconimide, N-octyl itaconimide, N-2-ethylhexyl itaconimide, N-cyclohexyl itaconimide and N-lauryl itaconimide;

Aminoalkyl (meth)acrylates: for example, aminoethyl (meth)acrylate, N,N-dimethylaminoethyl (meth)acrylate, N,N-diethylaminoethyl (meth)acrylate and t-butylaminoethyl (meth)acrylate;

Alkoxy group-containing monomers: for example, an alkoxyalkyl (meth)acrylate such as 2-methoxyethyl (meth)acrylate, 3-methoxypropyl (meth)acrylate, 2-ethoxyethyl (meth)acrylate, propoxyethyl (meth)acrylate, butoxyethyl (meth)acrylate and ethoxypropyl (meth)acrylate; and an alkoxy alkylene glycol (meth)acrylate such as methoxy ethylene glycol (meth)acrylate, methoxy propylene glycol (meth)acrylate, methoxy poly(ethylene glycol) (meth)acrylate and methoxy poly(propylene glycol) (meth)acrylate;

Alkoxysilyl group-containing monomers, for example, (3-(meth)acryloxypropyl)trimethoxysilane, (3-(meth)acryloxypropyl)triethoxysilane, (3-(meth)acryloxypropyl)methyldimethoxysilane, (3-(meth)acryloxypropyl)methyldiethoxysilane;

Vinyl esters: for example, vinyl acetate and vinyl propionate;

Vinyl ethers: for example, vinyl alkyl ethers such as methyl vinyl ether and ethyl vinyl ether;

Aromatic vinyl compounds: for example, styrene, α-methylstyrene and vinyl toluene;

Olefins: for example, ethylene, butadiene, isoprene and isobutylene; (Meth)acrylic esters having an alicyclic hydrocarbon group: for example, cyclopentyl (meth)acrylate, cyclohexyl (meth)acrylate, isobornyl (meth)acrylate, dicyclopentanyl (meth)acrylate, and adamantyl (meth)acrylate;

(Meth)acrylic esters having an aromatic hydrocarbon group: for example, phenyl (meth)acrylate, phenoxyethyl (meth)acrylate and benzyl (meth)acrylate;

Heterocyclic ring-containing (meth)acrylates such as tetrahydrofurfuryl (meth)acrylate, halogen atom-containing (meth)acrylates such as vinyl chloride and fluorine atom-containing (meth)acrylates, silicon atom-containing (meth)acrylates such as silicone (meth)acrylate, (meth)acrylic esters obtained from terpene compound derivative alcohols and the like.

When using such a copolymerizable monomer, its amount used is not particularly limited, but it is usually suitably at least 0.01% by weight of the entire monomers. From the standpoint of obtaining greater effect of the use of the copolymerizable monomer, the amount of copolymerizable monomer used can be 0.1% by weight or more of the entire monomers, or even 0.5% by weight or more. For easy balancing of adhesive properties, the amount of copolymerizable monomer used is suitably 50% by weight or less of the entire monomers, or preferably 40% by weight or less.

In some embodiments, the monomers used preferably include a carboxy group-containing monomer. Favorable examples of the carboxy group-containing monomer include acrylic acid (AA) and methacrylic acid (MAA). AA and MAA can be used together. When using both AA and MAA, their weight ratio (AA/MAA) is not particularly limited. For instance, it may range between about 0.1 and 10. In some embodiments, the weight ratio (AA/MAA) can be, for instance, about 0.3 or higher, or even about 0.5 or higher. The weight ratio (AA/MAA) can be, for instance, about 4 or lower, or even about 3 or lower.

The use of carboxy group-containing monomer helps quickly wet the layer A surface with an aqueous liquid such as water. This can help reduce the water-peel strength N2. The amount of carboxy group-containing monomer used can be, for instance, 0.05% by weight or more of the entire monomers, 0.1% by weight or more, 0.3% by weight or more, 0.5% by weight or more, or even 0.8% by weight or more. The ratio of carboxy group-containing monomer can be, for instance, 15% by weight or less, 10% by weight or less, 5% by weight or less, 4.5% by weight or less, 3.5% by weight or less, 3.0% by weight or less, or even 2.5% by weight or less. It is preferable that the carboxy group-containing monomer is not used excessively from the standpoint of inhibiting the diffusion of water through the layer A's bulk and reducing the decrease in water-resistant adhesive strength N1. It may also be advantageous that the carboxy group-containing monomer is not used excessively from the standpoint of preventing the water used for determining the water-peel strength N2 from being absorbed in the layer A resulting in a shortage of the water during the peeling.

In some embodiments, the monomers used may include a hydroxy group-containing monomer. With the use of hydroxy group-containing monomer, the PSA's cohesive strength and crosslink density can be adjusted and the normal adhesive strength N0 can be increased. When using a hydroxy group-containing monomer, its amount used can be, for instance, 0.01% by weight or more, 0.1% by weight or more, or even 0.5% by weight or more of the entire monomers. From the standpoint of inhibiting excessive water diffusion into the layer A's bulk, in some embodiments, the amount of hydroxy group-containing monomer used is, for instance, suitably 40% by weight or less of the entire monomers; it can be 30% by weight or less, 20% by weight or less, 10% by weight or less, 5% by weight or less, or even 3% by weight or less. The PSA sheet disclosed herein can be favorably made in an embodiment using essentially no hydroxy group-containing monomer as the monomer(s) for the layer A.

In some embodiments, the monomers used include an alkoxysilyl group-containing monomer. The alkoxysilyl group-containing monomer is an ethylenic unsaturated monomer having at least one (preferably two or more, e.g. two or three) alkoxysilyl group per molecule. Specific examples thereof are as mentioned earlier. For the alkoxysilyl group-containing monomer, solely one species or a combination of two or more species can be used. With the use of alkoxysilyl group-containing monomer, a crosslinked structure can be introduced in the PSA layer upon condensation reaction of the silanol group (silanol condensation). It is noted that the alkoxysilyl group-containing monomer can also be thought as the silane coupling agent described later.

In an embodiment where the monomers include an alkoxysilyl group-containing monomer, the ratio of the alkoxysilyl group-containing monomer in the total monomers can be, for instance, 0.005% by weight or higher; it is usually suitably 0.01% by weight or higher. From the standpoint of enhancing the tightness of adhesion to adherend, the ratio of the alkoxysilyl group-containing monomer can be, for instance, 0.5% by weight or less, 0.1% by weight or less, or even 0.05% by weight or less.

The monomer composition can be selected so that glass transition temperature determined by the Fox equation based on the monomer composition (or the "acrylic polymer's glass transition temperature" hereinafter) is −75° C. or higher and −10° C. or lower. In some embodiments, the glass transition temperature (Tg) of the acrylic polymer is suitably −20° C. or lower, preferably −30° C. or lower, more preferably −40° C. or lower, or yet more preferably −50° C. or lower, for instance, possibly −55° C. or lower. With lower acrylic polymer's Tg, the tightness of adhesion of the layer A to the adherend generally tends to improve. The layer A tightly adhered to the adherend is likely to prevent penetration of water into the interface between the adherend and the layer A when the PSA sheet is not to be peeled. This can be advantageous from the standpoint of increasing the water-resistant adhesive strength N1 and reducing the water-resistant adhesive strength reduction rate. From the standpoint of readily increasing the normal adhesive strength N0, the acrylic polymer's Tg can be, for instance, −70° C. or higher, or even −65° C. or higher.

Here, the Fox equation is a relational expression between the Tg of a copolymer and glass transition temperatures Tgi of homopolymers of the respective monomers constituting the copolymer.

$$1/Tg = \Sigma(Wi/Tgi)$$

In the Fox equation, Tg represents the glass transition temperature (unit: K) of the copolymer, Wi the weight fraction (copolymerization ratio by weight) of a monomer i in the copolymer, and Tgi the glass transition temperature (unit: K) of homopolymer of the monomer i.

As the glass transition temperatures of homopolymers used for determining the Tg value, values found in publicly known documents are used. For example, with respect to the monomers listed below, as the glass transition temperatures of homopolymers of the monomers, the following values are used:

2-ethylhexyl acrylate −70° C.
n-butyl acrylate −55° ° C.
methyl methacrylate 105° ° C.
methyl acrylate 8° C.
acrylic acid 106° ° C.
methacrylic acid 228° C.

With respect to the glass transition temperatures of homopolymers of monomers other than those listed above, values given in "*Polymer Handbook*" (3rd edition, John Wiley & Sons, Inc., Year 1989) are used. When the literature provides two or more values, the highest value is used.

With respect to monomers for which no glass transition temperatures of the corresponding homopolymers are given in *Polymer Handbook*, either, values obtained by the following measurement method are used (see Japanese Patent Application Publication No. 2007-51271). In particular, to a reaction vessel equipped with a thermometer, a stirrer, a nitrogen inlet and a condenser, are added 100 parts by weight of monomer, 0.2 part by weight of azobisisobutyronitrile, and 200 parts by weight of ethyl acetate as a polymerization solvent, and the mixture is stirred for one hour under a nitrogen gas flow. After oxygen is removed in this way from the polymerization system, the mixture is heated to 63° C. and the reaction is carried out for 10 hours. Then, it is cooled to room temperature, and a homopolymer solution having 33% by weight solids content is obtained. Then, this homopolymer solution is applied onto a release liner by flow coating and allowed to dry to prepare a test sample (a sheet of homopolymer) of about 2 mm thickness. This test sample is cut out into a disc of 7.9 mm diameter and is placed between parallel plates; and while applying a shear strain at a frequency of 1 Hz using a rheometer (ARES, available from Rheometrics Scientific, Inc.), the viscoelasticity is measured in the shear mode over a temperature range of −70° C. to 150° C. at a heating rate of 5° C./min; and the temperature corresponding to the peak top of the tan δ curve is taken as the Tg of the homopolymer.

The PSA layer disclosed herein can be formed using a PSA composition that includes monomers having an aforementioned composition in a polymer form, in a non-polymerized form (i.e. a form where polymerizable functional groups are unreacted), or as a mixture of these. The PSA composition may exist in various forms such as a water-dispersed PSA composition in which the PSA (adhesive component) is dispersed in water, a solvent-based PSA composition containing the PSA in an organic solvent, an active energy ray-curable PSA composition prepared to form PSA when cured by active energy rays such as UV rays and radioactive rays, a hot-melt PSA composition that is applied in a thermally melted state and forms PSA when cooled to near room temperature.

In the polymerization, a known or commonly used thermal polymerization initiator or photopolymerization initiator can be used in accordance with the polymerization method and polymerization conditions. These polymerization initiators can be used solely as one species or in a combination of two or more species.

The thermal polymerization initiator is not particularly limited. For example, azo-based polymerization initiator, peroxide-based polymerization initiator, a redox-based polymerization initiator by combination of a peroxide and a reducing agent, substituted ethane-based polymerization initiator and the like can be used. More specific examples include, but not limited to, azo-based initiators such as 2,2'-azobisisobutyronitrile, 2,2'-azobis(2-methylpropionamidine) disulfate, 2,2'-azobis(2-amidinopropane) dihydrochloride, 2,2'-azobis[2-(5-methyl-2-imidazolin-2-yl)propane]dihydrochloride, 2,2'-azobis(N,N'-dimethyleneisobutylamidine), and 2,2'-azobis[N-(2-carboxyethyl)-2-methylpropionamidine]hydrate; persulfates such as potassium persulfate and ammonium persulfate; peroxide-based initiators such as benzoyl peroxide, t-butyl hydroperoxide, and hydrogen peroxide; substituted ethane-based initiators such as phenyl-substituted ethane; redox-based initiators such as combination of a persulfate salt and sodium hydrogen sulfite, and combination of a peroxide and sodium ascorbate. Thermal polymerization can be preferably carried out at a temperature of, for instance, about 20° ° C. to 100° ° C. (typically 40° C. to 80° C.).

The photopolymerization initiator is not particularly limited. It is possible to use, for instance, ketal-based photopolymerization initiators, acetophenone-based photopolymerization initiators, benzoin ether-based photopolymerization initiators, acylphosphine oxide-based photopolymerization initiators, a ketol photopolymerization initiators, aromatic sulphonyl chloride-based photopolymerization initiators, photoactive oxime-based photopolymerization initiators, benzoin-based photopolymerization initiators, benzylic photopolymerization initiators, benzophenone-based photopolymerization initiators, and thioxanthone-based photopolymerization initiators.

Such thermal polymerization initiator or photopolymerization initiator can be used in a usual amount in accordance with the polymerization method, embodiment of polymerization, etc., and there are no particular limitations to the amount. For instance, relative to 100 parts by weight of monomers to be polymerized, about 0.001 part to 5 parts by weight (typically about 0.01 part to 2 parts by weight, e.g. about 0.01 part to 1 part by weight) of polymerization initiator can be used.

In the polymerization, various kinds of heretofore known chain transfer agent (which may also be thought as molecular weight-adjusting agent or polymerization degree-adjusting agent) can be used as necessary. As the chain transfer agent, mercaptans can be preferably used, such as n-dodecyl mercaptan, t-dodecyl mercaptan, and thioglycolic acid. Alternatively, a chain transfer agent free of sulfur atoms (a sulfur-free chain transfer agent) can be used as well. Specific examples of the sulfur free chain transfer agent include anilines such as N,N-dimethylaniline and N,N-diethylaniline; terpenoids such as α-pinene and terpinolene; styrenes such as α-methylstyrene and α-methylstyrene dimer; compounds having benzylidenyl groups such as dibenzylidene acetone, cinnamyl alcohol and cinnamyl aldehyde; hydroquinones such as hydroquinone and naphthohydroquinone; quinones such as benzoquinone and naphthoquinone; olefins such as 2,3-dimethyl-2-butene and 1,5-cyclooctadiene; alcohols such as phenol, benzyl alcohol and allyl alcohol; and benzyl hydrogens such as diphenylbenzene and triphenylbenzene.

For the chain transfer agent, solely one species or a combination of two or more species can be used. When using a chain transfer agent, it can be used in an amount of, for instance, about 0.01 part to 1 part by weight to 100 parts by weight of the monomers. The art disclosed herein can also be preferably implemented in an embodiment that uses no chain transfer agent.

The molecular weight of the polymer obtained by suitably employing the aforementioned various polymerization methods is not particularly limited and can be selected in a range suited for required properties. The polymer according suitably has a weight average molecular weight (Mw) of about $10 \times 10^4$ or higher (e.g. $20 \times 10^4$ or higher). From the standpoint of combining well-balanced cohesive strength and adhesive strength, it is suitably above $30 \times 10^4$. From the standpoint of obtaining good bonding reliability even in a high temperature environment, the polymer according to an embodiment preferably has a Mw of $40 \times 10^4$ or higher (typically about $50 \times 10^4$ or higher, e.g. about $55 \times 10^4$ or higher). The maximum Mw of the polymer can be usually about $500 \times 10^4$ or lower (e.g. about $150 \times 10^4$ or lower). The Mw can also be about $75 \times 10^4$ or lower. The Mw here refers to the value based on standard polystyrene determined by gel permeation chromatography (GPC). As the GPC system, for instance, model name HLC-8320 GPC (column: TSKgel GMH-H(S) available from Tosoh Corporation) can be used. The same applies to the Examples described later. The Mw can be the Mw of the polymer either in the PSA composition or in the PSA layer.

The PSA sheet according to some preferable embodiments has a layer A formed from a water dispersed PSA composition. Typical examples of the water-dispersed PSA composition include an emulsion-based PSA composition. The emulsion-based PSA composition typically comprises a polymerization product of monomers and an additive used as necessary.

Emulsion polymerization of the monomers is usually carried out in the presence of an emulsifier. The emulsifier used in the emulsion polymerization is not particularly limited; known anionic emulsifiers, nonionic emulsifiers and the like can be used. These emulsifiers can be used singly as one species or in a combination of two or more species.

Non-limiting examples of anionic emulsifiers include sodium lauryl sulfate, ammonium lauryl sulfate, sodium dodecyl benzene sulfonate, sodium polyoxyethylene lauryl sulfate, sodium polyoxyethylene alkyl ether sulfates, ammonium polyoxyethylene alkyl phenyl ether sulfates, sodium polyoxyethylene alkyl phenyl ether sulfates, and sodium polyoxyethylene alkyl sulfosuccinates. Non-limiting examples of non-ionic emulsifiers include polyoxyethylene alkyl ethers, polyoxyethylene alkyl phenyl ethers, polyoxyethylene aliphatic acid esters, and polyoxyethylene-polyoxypropylene block polymers. Reactive functional group-containing emulsifiers (reactive emulsifiers) can be used as well. Examples of reactive emulsifiers include a radically polymerizable emulsifier having a structure of an aforementioned anionic emulsifier or nonionic emulsifier with a radically polymerizable group such as propenyl group and ally ether group introduced therein.

In the emulsion polymerization, the emulsifier can be used in an amount of, for instance, 0.2 part by weight or greater, 0.5 part by weight or greater, or 1.0 part by weight or greater, or even 1.5 parts by weight or greater, relative to 100 parts by weight of the monomers. From the standpoint of increasing the water-resistant adhesive strength N1, reducing the water-resistant adhesive strength reduction rate or increasing the PSA layer's transparency, in some embodiments, the amount of emulsifier used is usually suitably 10 parts by weight or less to 100 parts by weight of the monomers, preferably 5 parts by weight or less, or possibly even 3 parts by weight or less. It is noted that the emulsifier used here for emulsion polymerization can also serve as a hydrophilicity enhance in the layer A.

By emulsion polymerization, a polymerization reaction mixture is obtained as an emulsion in which the polymerization product (polymer) of the monomers is dispersed in water. The water-dispersed PSA composition used for forming the layer A can be preferably produced using the polymerization reaction mixture.

The PSA sheet according to some other preferable embodiments may have a layer A formed from a solvent-based PSA composition. The solvent-based PSA composition typically includes a solution polymerization product of the monomers as well as additives used as necessary. The solvent (polymerization solvent) used for the solution polymerization can be suitably selected among heretofore known organic solvents. For instance, it is possible to use one species of solvent or a mixture of two or more solvents, selected among aromatic compounds (typically aromatic hydrocarbons) such as toluene; esters such as ethyl acetate and butyl acetate; aliphatic or alicyclic hydrocarbons such as hexane and cyclohexane; halogenated alkanes such as 1,2-dichloroethane; lower alcohols such as isopropanol (e.g. monohydric alcohols having 1 to 4 carbon atoms); ethers such as tert-butyl methyl ether; and ketones such as methyl ethyl ketone. Solution polymerization gives the polymerization reaction mixture in a form where the polymerization product of the monomers is dissolved in a polymerization solvent. The solvent-based PSA composition used for forming the layer A can be preferably produced using the polymerization reaction mixture.

The PSA sheet according to other preferable embodiments may have a layer A formed from an active energy ray-curable PSA composition. The term "active energy ray" in this Description refers to an energy ray having energy capable of causing a chemical reaction such as polymerization, crosslinking, initiator decomposition, etc. Examples of the active energy ray herein include lights such as ultraviolet (UV) rays, visible lights, infrared lights, radioactive rays such as α rays, β rays, γ rays, electron beam, neutron radiation, and X rays. A favorable example of the active energy ray-curable PSA composition is a photocurable PSA composition. The photocurable PSA composition has an advantage of being able to easily form even a thick PSA layer. In particular, a UV ray-curable PSA composition is preferable.

The photocurable PSA composition typically comprises at least some of the monomers used to form the composition (possibly a certain species among the monomers or a fraction of its quantity) as a polymer. The polymerization method for forming the polymer is not particularly limited. Heretofore known various polymerization methods can be suitably used. For instance, thermal polymerization (typically carried out in the presence of a thermal polymerization initiator) such as solution polymerization, emulsion polymerization, bulk polymerization, etc.; photopolymerization carried out by irradiating light such as UV ray, etc. (typically in the presence of a photopolymerization initiator); radioactive ray polymerization carried out by irradiating radioactive rays such as β rays, γ rays, etc.; and the like. In particular, photopolymerization is preferable.

The photocurable PSA composition according to a preferable embodiment comprises a partial polymer (partial polymerization product) of the monomers. Such a partial polymer is typically a mixture of a polymer derived from the monomers and unreacted monomers, and it preferably has a syrup form (viscous liquid). Hereinafter, a partial polymer having such a form may be referred to as "monomer syrup" or simply "syrup." The polymerization method for partial polymerization of the monomers is not particularly limited. Various polymerization methods such as those described earlier can be suitably selected and used. From the standpoint of the efficiency and convenience, a photopolymerization method can be preferably used. Photopolymerization allows easy control of the monomer conversion of the monomers through the polymerization conditions such as the radiation dose (amount) of light.

The monomer conversion of the monomer mixture in the partial polymer is not particularly limited. The monomer conversion can be, for instance, about 70% by weight or less, or preferably about 60% by weight or less. From the standpoint of the ease of preparing the PSA composition containing the partial polymer, the ease of coating, etc., the monomer conversion is usually suitably about 50% by weight or less, or preferably about 40% by weight or less (e.g. about 35% by weight or less). The minimum monomer conversion is not particularly limited. It is typically about 1% by weight or greater, or usually suitably about 5% by weight or greater.

The PSA composition containing a partial polymer of the monomers can be obtained by partially polymerizing a monomer mixture containing the entire amount of the monomers used for preparing the PSA composition by a suitable polymerization method (e.g. a photopolymerization method). The PSA composition containing a partial polymer of the monomers can be a mixture of a partially or fully polymerized product of a part of the monomers used for preparing the PSA composition, and remaining monomers or a partial polymer thereof. As used herein, the "fully polymerized product" indicates that the monomer conversion is above 95% by weight.

In the partial polymer-containing PSA composition, other components (e.g. photopolymerization initiator, polyfunctional monomer, crosslinking agent, hydrophilicity enhancer, etc.) used as necessary can be added. The method of adding such other components is not particularly limited. For instance, it can be included in the monomer mixture in advance or added to the partial polymer as well.

(Hydrophilicity Enhancer)

In the PSA sheet disclosed herein, the layer A forming one surface of the PSA layer preferably includes a hydrophilicity enhancer in addition to the polymerization reaction product of the monomers. For instance, a preferable PSA sheet has a layer A comprising an acrylic polymer as the polymerization reaction product and further comprising a hydrophilicity enhancer.

As the hydrophilicity enhancer, a suitable species can be selected and used among various materials capable of enhancing the hydrophilicity of the layer A surface. The enhanced hydrophilicity of the layer A can help quickly wet the layer A surface with an aqueous liquid such as water. By this, for instance, when measuring the water-peel strength N2, a drop of water initially dropped is allowed to spread over the layer A surface, following the movement of the peel front line of the PSA sheet peeling from the adherend, and the water-peel strength N2 can be effectively reduced. In the PSA sheet peeling method including moving the peel front line while allowing the aqueous liquid such as water to enter the interface between the PSA sheet and the adherend, the same effect can enhance the peeling properties of the PSA sheet from the adherend.

As the hydrophilicity enhancer, it is possible to use a known surfactant (anionic surfactant, nonionic surfactant, cationic surfactant, etc.), hydrophilic plasticizer (possibly water-soluble plasticizer), water-soluble polymer, etc. Preferable surfactants include nonionic surfactants, anionic surfactants, and combinations thereof. For the hydrophilicity enhancer, solely one species or a combination of two or more species can be used.

As the hydrophilic plasticizer, various polyols (preferably polyether polyols) can be used. Specific examples of the polyol include polyethylene glycol, polypropylene glycol, polyoxypropylene sorbitol ether, and polyglycerin. These hydrophilic plasticizers can be used solely as one species or in a combination of two or more species.

Examples of the water soluble polymer include polyvinyl alcohol, polyvinyl pyrrolidone, and polyacrylic acid.

In some embodiments, a compound having a polyoxyalkylene backbone can be preferably used as the hydrophilic plasticizer. As the compound having a polyoxyalkylene backbone, it is possible to use, for instance, polyalkylene glycols such as polyethylene glycol (PEG) and polypropylene glycol (PPG); polyethers containing polyoxyethylene units; polyethers containing polyoxypropylene units (e.g. polyoxypropylene sorbitol ether), compounds containing oxyethylene units and oxypropylene units (the sequence of these units may be random or blocked); and derivatives of these. Among the aforementioned surfactants, a compound having a polyoxyalkylene backbone can be used as well. These can be used solely as one species or in a combination of two or more species. Among them, it is preferable to use a compound containing a polyoxyethylene backbone (or a polyoxyethylene segment). PEG is more preferable.

The molecular weight (chemical formula weight) of the polyoxyalkylene backbone-containing compound (e.g. PEG) is not particularly limited. For instance, it is suitably lower than 1000. In view of the ease of preparation of PSA composition, it is preferably about 600 or lower (e.g. 500 or lower). The minimum molecular weight of the polyoxyalkylene backbone-containing compound (e.g. polyethylene glycol) is not particularly limited. A preferably used species has a molecular weight of about 100 or higher (e.g. about 200 or higher, or even about 300 or higher).

Examples of the anionic surfactant include alkyl benzene sulfonates such as nonyl benzene sulfonate and dodecyl benzene sulfonate (e.g. sodium dodecyl benzene sulfonate); alkyl sulfates such as lauryl sulfate (e.g. sodium lauryl sulfate, ammonium lauryl sulfate) and octadecyl sulfate; fatty acid salts; polyether sulfates including polyoxyethylene alkyl ether sulfates (e.g. sodium polyoxyethylene alkyl ether sulfate) such as polyoxyethylene octadecyl ether sulfate and polyoxyethylene lauryl ether sulfate, polyoxyethylene alkyl phenyl ether sulfates (e.g. ammonium polyoxyethylene alkyl phenyl ether sulfate, sodium polyoxyethylene alkyl phenyl ether sulfate) such as polyoxyehtylene lauryl phenyl ether sulfate, and polyoxyethylene styrenated phenyl ether sulfate; polyoxyethylene alkyl ether phosphoric acid esters such as polyoxyethylene stearyl ether phosphoric acid ester and polyoxyethylene lauryl ether phosphoric acid ester; polyoxyethylene alkyl ether phosphates such as sodium salts and potassium salts of the polyoxyethylene alkyl ether phosphoric acid esters; sulfosuccinates such as lauryl sulfosuccinate, polyoxyethylene lauryl sulfosuccinate (e.g. sodium polyoxyethylene alkyl sulfosuccinate); and polyoxyethylene alkyl ether acetates. When the anionic surfactant is in a salt form, the salt can be, for instance, a metal salt (preferably a monovalent metal salt) such as sodium salt, potassium salt, calcium salt and magnesium salt; ammonium salt; or amine salt. For the anionic surfactant, solely one species or a combination of two or more species can be used.

Examples of the cationic surfactant include polyether amines such as polyoxyethylene lauryl amine and polyoxyethylene stearyl amine.

Examples of the nonionic surfactant include polyoxyethylene alkyl ethers (polyoxyethylene lauryl ether, polyoxyethylene cetyl ether, polyoxyethylene stearyl ether, polyoxyethylene oleyl ether, etc.); polyoxyethylene alkyl phenyl ethers (polyoxyethylene octyl phenyl ether, polyoxyethylene nonyl phenyl ether, etc.); sorbitan fatty acid esters such as sorbitan monolaurate, sorbitan monopalmitate, sorbitan monostearate, and sorbitan monooleate; polyoxyethylene sorbitan fatty acid esters such as polyoxyethylene sorbitan monolaurate, polyoxyethylene sorbitan monopalmitate, polyoxyethylene sorbitan monostearate, polyoxyethylene sorbitan tristearate, polyoxyethylene sorbitan triisostearate, polyoxyethylene sorbitan monooleate, and polyoxyethylene sorbitan trioleate; polyoxyalkylene ethers such as polyoxyethylene glyceryl ether, polyoxypropylene glyceryl ether, and polyoxyethylene bisphenol A ether; polyoxyethylene fatty acid esters; polyoxyethylene glyceryl ether fatty acid esters; and polyoxyethylene-polyoxypropylene block polymers. For the nonionic surfactant, solely one species or a combination of two or more species can be used.

In some embodiments, for instance, an anionic surfactant having at least one —POH group, —COH group or —SOH group can be preferably used. Among them, surfactants having —POH groups are preferable. Such a surfactant typically includes a phosphoric acid ester structure; and it can be, for instance a phosphoric acid monoester (ROP(=O)(OH)$_2$ wherein R is a monovalent organic group), a phosphoric acid diester ((RO)$_2$P(=O)OH wherein R is the same or different monovalent organic group(s)), or a mixture including both a monoester and a diester. Favorable examples of the POH group-containing surfactant include polyoxyethylene alkyl ether phosphoric acid ester. The number of carbon atoms of the alkyl group in the polyoxyethylene alkyl ether phosphoric acid ester can be, for instance, 6 to 20, 8 to 20, 10 to 20, 12 to 20, or even 14 to 20.

The HLB of the hydrophilicity enhancer is not particularly limited. For instance, it can be 3 or greater, approximately 6 or greater is appropriate, and may be 8 or greater (e.g. 9 or greater). In a preferable embodiment, the hydrophilicity enhancer has an HLB of 10 or greater. This tends to preferably bring about water-peeling properties. The HLB is more preferably 11 or greater, yet more preferably 12 or greater, or particularly preferably 13 or greater (e.g. 14 or greater). When the layer A includes a hydrophilicity enhancer (typically a surfactant) having an HLB in these ranges, water-peeling properties can be more effectively exhibited. The maximum HLB is 20 or less, for instance, possibly 18 or less, 16 or less, or even 15 or less.

HLB in this Description is hydrophile-lipophile balance by Griffin, and the value indicates the degree of affinity of a surfactant to water and oil, and the ratio between hydrophilicity and lipophilicity is represented by a numerical value between 0 and 20. HLB is defined in J. Soc. Cosmetic Chemists, 1, 311 (1949) by W. C. Griffin; "Surfactant Handbook" by Koshitami Takahashi, Yoshiro Namba, Motoo Koike and Masao Kobayashi, 3rd edition, Kogaku Tosho Publishing, Nov. 25, 1972, p 179-182; and the like. A hydrophilicity enhancer having such HLB can be selected based on technical common knowledge of those skilled in the art, taking into account these reference documents as necessary.

Such a hydrophilicity enhancer is preferably included in a free state in the layer A. As the hydrophilicity enhancer, from the standpoint of the ease of preparing the PSA composition, a species that exits as liquid at room temperature (about 25° C.) is preferably used. It is needless to say that among the surfactants, there are compounds having polyoxyalkylene backbones, and the reverse is true as well.

The hydrophilicity enhancer containing layer A is typically formed from a PSA composition comprising a hydrophilicity enhancer. The PSA composition can be a water-dispersed PSA composition, solvent-based PSA composition, active energy ray-curable PSA composition, or hot-melt PSA composition. In some embodiments, the hydrophilicity enhancer containing layer A can be formed from a photocurable or solvent-based PSA composition. The layer A can be photo-crosslinkable.

The hydrophilicity enhancer content in the layer A is not particularly limited. It can be selected so that the effect of the use of hydrophilicity enhancer is suitably obtained. In some embodiments, the hydrophilicity enhancer content can be, for instance, 0.001 part by weight or greater to 100 parts by weight of the monomers forming the polymer (e.g. acrylic polymer) in the layer A. It is usually suitably 0.01 part by weight or greater, 0.03 part by weight or greater, 0.07 part by weight or greater, or even 0.1 part by weight or greater. In some preferable embodiments, the hydrophilicity enhancer content can be, for instance, 0.2 part by weight or greater with respect to 100 parts by weight of the monomers. From the standpoint of obtaining greater effect, it can be 0.5 part by weight or greater, 1.0 part by weight or greater, or even 1.5 parts by weight or greater. From the standpoint of inhibiting excessive diffusion of water into the bulk of the layer A, in some embodiments, the hydrophilicity enhancer content can be, for instance, 20 parts by weight or less to 100 parts by weight of the monomers. It is usually suitably 10 parts by weight or less, preferably 5 parts by weight or less, or possibly 3 parts by weight or less. It is preferable that the hydrophilicity enhancer content is not in large excess in increasing the water-resistant adhesive strength N1 and reducing the water-resistant adhesive strength decreasing rate, or in view of increasing the transparency of the PSA layer as well. For instance, in some embodiments, the hydrophilicity enhancer content to 100 parts by weight of the monomers can be below 2 parts by weight, below 1 part by weight, below 0.7 part by weight, below 0.3 part by weight, or even below 0.2 part by weight. A hydrophilicity enhancer having an HLB of 10 or greater tends to exhibit good water-peeling properties even when used in a small amount.

(Silane Coupling Agent)

In some embodiments, the layer A can include a silane coupling agent. According to the layer A including a silane coupling agent, it may be possible to favorably obtain a PSA sheet having a low water-resistant adhesive strength reduction rate and a high water-peel adhesive strength reduction rate (and/or a long water penetration distance).

Examples of the silane coupling agent include silicon compounds having an epoxy structure such as 3-glycidoxypropyltrimethoxysilane, 3-glycidoxypropylmethyldimethoxysilane and 2-(3,4-epoxycyclohexyl) ethyltrimethoxysilane; amino group-containing silicon compounds such as 3-aminopropyltrimethoxysilane, N-(2-aminoethyl)3-aminopropyltrimethoxysilane and N-(2-aminoethyl) 3-aminopropylmethyldimethoxysilane; 3-chloropropyltrimethoxysilane; acetoacetyl group-containing trimethoxysilane; (meth) acrylate group-containing silane coupling agents such as 3-acryloxypropyltrimethoxysilane, and 3-methacryloxypropyltriethoxysilane; and isocyanate group-containing silane coupling agents such as 3-isocyanatopropyltriethoxysilane. In some embodiments, the use of a silane coupling agent having a trialkoxysilyl group may preferably bring about the aforementioned effect. Particularly preferable silane coupling agents include 3-glycidoxypropyltrimethoxysilane and acetoacetyl group-containing trimethoxysilane.

The amount of silane coupling agent used can be selected so that desirable effect is obtained by the use, and is not particularly limited. In some embodiments, the silane coupling agent can be used in an amount of, for instance, 0.001 part by weight or greater to 100 parts by weight of the monomers forming the polymer included in the layer A. From the standpoint of obtaining greater effect, it can be 0.005 part by weight or greater, 0.01 part by weight or greater, or even 0.015 part by weight or greater. From the standpoint of enhancing the tightness of adhesion to adherend, in some embodiments, the amount of silane coupling agent used can be, for instance, 3 parts by weight or less, 1 part by weight or less, or even 0.5 part by weight or less, relative to 100 parts by weight of the monomers forming the layer A.

In some embodiments, the layer A may include the silane coupling agent in a free state. The layer A in such an embodiment can be formed from, for instance, a photocurable or solvent-based PSA composition. The layer A can be photo-crosslinkable.

In an embodiment where the monomers used include an alkoxysilyl group-containing monomer, the alkoxysilyl group-containing monomer can be used as part or all of the silane coupling agent in the layer A. The layer A in such an embodiment can be formed from, for instance, a water-dispersed PSA composition.

(Crosslinking Agent)

The layer A can include a crosslinking agent as necessary. The type of crosslinking agent is not particularly limited. For instance, a suitable species can be selected and used among heretofore known crosslinking agents. Specific examples of the crosslinking agent include isocyanate-based crosslinking agent, epoxy-based crosslinking agent, oxazoline-based crosslinking agent, aziridine-based crosslinking agent, carbodiimide-based crosslinking agent, melamine-based crosslinking agent, urea-based crosslinking agent, metal alkoxide-based crosslinking agent, metal chelate-based crosslinking agent, metal salt-based crosslinking agents, hydrazine-based crosslinking agent, and amine-based crosslinking agent. These can be used solely as one species or in a combination of two or more species.

As an example of the isocyanate-based crosslinking agent, a bifunctional or higher polyfunctional isocyanate compound can be used. Examples include aromatic isocyanates such as tolylene diisocyanate, xylene diisocyanate, polymethylene polyphenyl diisocyanate, tris (p-isocyanatophenyl)thiophosphate, and diphenylmethane diisocyanate; alicyclic isocyanates such as isophorone diisocyanate; and aliphatic isocyanates such as hexamethylene diisocyanate. Commercial products include isocyanate adducts such as trimethylolpropane/tolylene diisocyanate trimer adduct (trade name CORONATE L available from Tosoh Corporation), trimethylolpropane/hexamethylene diisocyanate trimer adduct (trade name CORONATE HL available from Tosoh Corporation), and isocyanurate of hexamethylene diisocyanate (trade name CORONATE HX available from Tosoh Corporation). In a water-dispersed PSA composition, it is preferable to use an isocyanate crosslinking agent that is soluble or dispersible in water. For instance, a water-soluble, water-dispersible or self-emulsifying isocyanate-based crosslinking agent can be preferably used. A so-called blocked-isocyanate-type of isocyanate crosslinking agent having a blocked isocyanate group can be preferably used.

As the epoxy-based crosslinking agent, a species having two or more epoxy groups per molecule can be used without particular limitations. A preferable epoxy-based crosslinking agent has 3 to 5 epoxy groups per molecule. Specific examples of the epoxy-based crosslinking agent include N,N,N',N'-tetraglycidyl-m-xylenediamine, 1,3-bis(N,N-diglycidylaminomethyl)cyclohexane, 1,6-hexanediol diglycidyl ether, polyethylene glycol diglycidyl ether, and polyglycerol polyglycidyl ether. Examples of commercial epoxy-based crosslinking agents include product names TETRAD-X and TETRAD-C available from Mitsubishi Gas Chemical Co., Inc.; product name EPICLON CR-5L available from DIC Corp.; product name DENACOL EX-512 available from Nagase ChemteX Corporation; and product name TEPIC-G available from Nissan Chemical Industries, Ltd. In a water-dispersed PSA composition, it is preferable to use a water-soluble or water dispersible epoxy-based crosslinking agent.

As the oxazoline-based crosslinking agent, a species having one or more oxazoline groups in one molecule can be used without particular limitations. In the water dispersed PSA composition, it is preferable to use a water-soluble or water-dispersible oxazoline-based crosslinking agent.

Examples of the aziridine-based crosslinking agent include trimethylolpropane tris[3-(1-aziridinyl)propionate] and trimethylolpropane tris[3-(1-(2-methyl) aziridinylpropionate)].

As the carbodiimide-based crosslinking agent, a low molecular weight compound or a high molecular weight compound having two or more carbodiimide groups can be used. In a water dispersed PSA composition, it is preferable to use a water-soluble or water dispersible carbodiimide-based crosslinking agent.

In some embodiments, a peroxide can also be used as the crosslinking agent. Examples of the peroxide include di(2-ethylhexyl) peroxydicarbonate, di(4-t-butylcyclohexyl) peroxydicarbonate, di-sec-butylperoxydicarbonate, t-butylperoxyneodecanoate, t-hexylperoxypivalate, t-butylperoxypivalate, dilauroyl peroxide, di-n-octanoyl peroxide, 1,1,3,3-tetramethylbutylperoxyisobutyrate, and dibenzoyl peroxide. Among these, peroxides having particularly excellent crosslinking reaction efficiency include di(4-t-butylcyclohexyl) peroxydicarbonate, dilauroyl peroxide, and dibenzoyl peroxide. It is noted that when a peroxide is used as the polymerization initiator, the remaining peroxide unused in the polymerization reaction can be used for the crosslinking reaction. In this case, when the remaining peroxide is quantified and the proportion of peroxide is less than a prescribed amount, the peroxide can be added as necessary to obtain the prescribed amount. Peroxide can be quantified by the method described in Japanese Patent No. 4971517.

The crosslinking agent content (when two or more crosslinking agents are included, the total amount thereof) is not particularly limited. From the standpoint of obtaining a PSA that exhibits well-balanced adhesive properties such as adhesive strength and cohesive strength, the crosslinking agent content is usually suitably 5 parts by weight or less to 100 parts by weight of the monomers used for preparing the PSA composition, preferably about 0.001 part to 5 parts by weight, more preferably about 0.001 part to 4 parts by weight, or yet more preferably about 0.001 part to 3 parts by weight. Alternatively, the PSA composition can also be free of aforementioned crosslinking agents. For instance, when a photocurable PSA composition is used as the PSA composition disclosed herein, the PSA composition may be essentially free of a crosslinking agent such as an isocyanate-based crosslinking agent. Here, the PSA composition being essentially free of a crosslinking agent (typically an isocyanate-based crosslinking agent) means that the amount of the crosslinking agent relative to 100 parts by weight of the monomers is less than 0.05 part by weight (e.g. less than 0.01 parts by weight), including that the amount of the crosslinking agent is 0 part by weight to 100 parts by weight of the monomers.

To allow an aforementioned crosslinking reaction to proceed effectively, a crosslinking catalyst may be used. Examples of the crosslinking catalyst include metal-based crosslinking catalysts such as tetra-n-butyl titanate, tetraisopropyl titanate, ferric acetylacetonate, butyltin oxide, and dioctyltin dilaurate. In particular, a tin-based crosslinking catalyst such as dioctyltin dilaurate is preferable. The amount of crosslinking catalyst used is not particularly limited. To 100 parts by weight of monomers used in preparation of the PSA composition, the amount of crosslinking catalyst used can be, for instance, about 0.0001 part or greater and 1 part by weight or less, 0.001 part or greater and 0.1 part by weight or less, or 0.005 part by weight or greater and 0.5 part by weight or less.

The PSA composition used for forming the layer A can include, as a crosslinking retarder, a compound that exhibits keto-enol tautomerism. For instance, in a PSA composition including an isocyanate-based crosslinking agent or a PSA composition usable upon addition of isocyanate-based crosslinking agent, it is preferable to employ an embodiment where it includes a compound that exhibits keto-enol tautomerism. This can bring about the effect of extending a pot life of the PSA composition.

As the compound exhibiting keto-enol tautomerism, various β-dicarbonyl compounds can be used. Specific examples include β-diketones such as acetylacetone and 2,4-hexanedione; acetoacetates such as methyl acetoacetate and ethyl acetoacetate; propionylacetates such as ethyl propionylacetate; isobutyrylacetates such as ethyl isobutyrylacetate; and malonates such as methyl malonate and ethyl malonate. Particularly favorable compounds include acetylacetone and acetoacetates. For the keto-enol tautomerizing compound, solely one species or a combination of two or more species can be used.

The amount of the keto-enol tautomerizing compound included relative to 100 parts by weight of the monomers used for preparing the PSA composition can be, for instance, 0.1 part by weight or greater and 20 parts by weight or less; and it is usually suitably 0.5 part by weight or greater and 15 parts by weight or less, for instance, possibly 1 part by weight or greater and 10 parts by weight or less, or even 1 part by weight or greater and 5 parts by weight or less.

(Polyfunctional Monomer)

In the layer A, a polyfunctional monomer may be used as necessary. The polyfunctional monomer used in place of or in combination with a crosslinking agent as described above may be helpful for purposes such as adjusting the cohesive strength. For instance, it is preferable to use a polyfunctional monomer in a PSA layer formed from a photo-curable PSA composition. In the PSA sheet before applied to adherend, the polyfunctional monomer in the PSA layer may have polymerizable functional groups in an unreacted form, in a partially reacted form, or in a reacted form.

Examples of the polyfunctional monomer include ethylene glycol di(meth)acrylate, propylene glycol di(meth)acrylate, polyethylene glycol di(meth)acrylate, polypropylene glycol di(meth)acrylate, neopentyl glycol di(meth)acrylate, pentaerythritol di(meth)acrylate, pentaerythritol tri(meth)acrylate, dipentaerythritol hexa(meth)acrylate, ethyleneglycol di(meth)acrylate, 1,6-hexanediol di(meth)acrylate, 1,12-dodecanediol di(meth)acrylate, trimethylolpropane tri(meth)acrylate, tetramethylolmethane tri(meth)acrylate, allyl (meth)acrylate, vinyl (meth)acrylate, divinylbenzene, epoxy acrylate, polyester acrylate, urethane acrylate, butyldiol (meth)acrylate and hexyldiol di(meth)acrylate. Among them, trimethylolpropane tri(meth)acrylate, 1,6-hexanediol di(meth)acrylate and dipentaerythritol hexa(meth)acrylate can be favorably used. For the polyfunctional monomer, solely one species or a combination of two or more species can be used.

The amount of polyfunctional monomer used depends on its molecular weight, the number of functional groups therein, etc.; it is usually suitably in a range of about 0.01 part to 3.0 parts by weight to 100 parts by weight of monomers forming the polymer in the PSA layer. In some embodiments, the amount of polyfunctional monomer used to 100 parts by weight of the monomers can be, for instance, 0.02 part by weight or greater, 0.1 part by weight or greater, 0.5 part by weight or greater, 1.0 part by weight or greater, or even 2.0 parts by weight or greater. With increasing amount of polyfunctional monomer used, a higher cohesive strength tends to be obtained. On the other hand, from the standpoint of avoiding a decrease in adhesiveness between the PSA layer and the adjacent layer caused by an excessive increase in cohesive strength, the amount of polyfunctional monomer used to 100 parts by weight of the monomers can be, for instance, 10 parts by weight or less, 5.0 parts by weight or less, or even 3.0 parts by weight or less.

(Acrylic Oligomer)

From the standpoint of increasing the cohesive strength, enhancing the adhesion to the surface (e.g. a surface of the support, etc.) adjacent to the PSA layer, etc., an acrylic oligomer can be added to the layer A. As the acrylic oligomer, it is preferable to use a species having a higher Tg relative to the Tg of the polymer (e.g. an acrylic polymer) in the PSA layer.

The acrylic oligomer's Tg is not particularly limited. It can be, for instance, about 20° ° C. or higher and 300° ° C. or lower. The Tg can also be, for instance, about 30° C. or higher, about 40° C. or higher, about 60° C. or higher, about 80° C. or higher, or even about 100° C. or higher. With increasing acrylic oligomer's Tg, the effect to increase the cohesive strength generally tends to improve. From the standpoint of the anchoring properties to the support, impact absorption, etc., the acrylic oligomer's Tg can be, for instance, about 250° C. or lower, about 200° ° C. or lower, about 180° C. or lower, or even about 150° C. or lower. Similar to the acrylic polymer's Tg corresponding to the monomer composition, the acrylic oligomer's Tg value is determined by the Fox equation.

The acrylic oligomer may have a Mw of typically about 1000 or higher and lower than about 30000, preferably about 1500 or higher and lower than about 10000, or yet more preferably about 2000 or higher and lower than about 5000. With the Mw in these ranges, favorable effect is likely to be obtained to enhance the cohesion and the adhesion to the adjacent surface. The acrylic oligomer's Mw can be measured by gel permeation chromatography (GPC) and determined based on standard polystyrene. Specifically, it is measured at a flow rate of about 0.5 mL/min, using two TSKgelGMH-H (20) columns as columns and tetrahydrofuran solvent on HPLC 8020 available from Tosoh Corporation.

Examples of the monomers forming the acrylic oligomer include (meth)acrylate monomers such as the aforementioned various $C_{1-20}$ alkyl (meth)acrylates; the aforementioned various alicyclic hydrocarbon group-containing (meth)acrylates; the aforementioned various aromatic hydrocarbon group-containing (meth)acrylates; and (meth)acrylates obtained from terpene-derived alcohols. These can be used solely as one species or in a combination of two or more species.

From the standpoint of enhancing the adhesion, the acrylic oligomer preferably includes, as a monomeric unit, an acrylic monomer having a relatively bulky structure, typified by an alkyl (meth)acrylate whose alkyl group has a branched structure such as isobutyl (meth)acrylate and t-butyl (meth)acrylate; an alicyclic hydrocarbon group-containing (meth)acrylate; and an aromatic hydrocarbon group-containing (meth)acrylate. When UV rays are used for the synthesis of the acrylic oligomer or for the preparation of the PSA layer, for being less likely to inhibit the polymerization, a monomer having a saturated hydrocarbon group at the ester terminus is preferable. For instance, an alkyl (meth)acrylate whose alkyl group has a branched structure and a saturated alicyclic hydrocarbon group-containing (meth)acrylate can be favorably used.

The ratio of (meth)acrylate monomer in the entire monomers forming the acrylic oligomer is typically above 50% by weight, preferably 60% by weight or higher, or more preferably 70% by weight or higher (e.g. 80% by weight or higher, or even 90% by weight or higher). In a preferable embodiment, the acrylic oligomer has a monomer composition essentially consisting of one, two or more species of (meth)acrylate monomer. When the monomers include an alicyclic hydrocarbon group-containing (meth)acrylate and a $C_{1-20}$ alkyl (meth)acrylate, their weight ratio is not particularly limited. For instance, it can be in ranges between 10/90 and 90/10, between 20/80 and 80/20, between 70/30 and 30/70, etc.

As the acrylic oligomer forming monomers, in addition to the (meth)acrylate monomer described above, a functional group-containing monomer can be used as necessary. Examples of the functional group-containing monomer include monomers having nitrogen atom-containing heterocyclic rings such as N-vinyl-2-pyrrolidone and N-acryloylmorpholine; amino group-containing monomers such as N,N-dimethylaminoethyl (meth)acrylate; amide group-containing monomers such as N,N-diethyl (meth)acrylamide; carboxy group-containing monomers such as AA and MAA; and hydroxy group containing monomers such as 2-hydroxyethyl (meth)acrylate. These functional group-containing monomers can be used solely as one species or in a combination of two or more species. When a functional group-containing monomer is used, the ratio of the functional group-containing monomer in the entire monomers forming the acrylic oligomer can be, for instance, 1% by weight or greater, 2% by weight or greater, or 3% by weight or greater. It can also be, for instance, 15% by weight or less, 10% by weight or less, or 7% by weight or less.

Examples of favorable acrylic oligomers include homopolymers of various monomers such as dicyclopentanyl methacrylate (DCPMA), cyclohexyl methacrylate (CHMA), isobornyl methacrylate (IBXMA), isobornyl acrylate (IBXA), dicyclopentanyl acrylate (DCPA), 1-adamantyl methacrylate (ADMA) and 1-adamantyl acrylate (ADA) as well as a copolymer of DCPMA and MMA, copolymer of DCPMA and IBXMA, copolymer of ADA and methyl methacrylate (MMA), copolymer of CHMA and isobutyl methacrylate (IBMA), copolymer of CHMA and IBXMA, copolymer of CHMA and acryloylmorpholine (ACMO), copolymer of CHMA and diethylacrylamide (DEAA), and copolymer of CHMA and AA.

The acrylic oligomer can be formed by polymerizing its constituent monomers. The polymerization method and the polymerization conditions are not particularly limited. Various heretofore known polymerization methods (e.g. solution polymerization, emulsion polymerization, bulk polymerization, photopolymerization, radiation polymerization, etc.) can be employed under suitable conditions. The types of polymerization initiator (e.g. azo polymerization initiator)

that can be used as necessary are essentially the same as those exemplified for the synthesis of the acrylic polymer. The amount of polymerization initiator and the amount of chain transfer agent (e.g. a mercaptan) used optionally are suitably selected based on common technical knowledge so as to obtain a desirable molecular weight. Thus, details are omitted.

When the layer A includes an acrylic oligomer, its amount included can be, for instance, 0.01 part by weight or greater to 100 parts by weight of the monomers forming the polymer (typically acrylic polymer) in the layer A. From the standpoint of obtaining greater effect, it may be 0.05 part by weight or greater, or 0.1 part by weight or greater, or even 0.2 part by weight or greater. From the standpoint of the compatibility with the polymer, etc., the acrylic oligomer content is usually suitably less than 50 parts by weight, preferably less than 30 parts by weight, more preferably 25 parts by weight or less, for instance, possibly 10 parts by weight or less, 5 parts by weight or less, or even 1 part by weight or less.

(Tackifier Resin)

The layer A may comprise a tackifier resin. Examples of the tackifier resin include rosin-based tackifier resins, rosin derivative tackifier resins, petroleum-based tackifier resins, terpene-based tackifier resins, phenolic tackifier resins, and ketone-based tackifier resins. These can be used singly as one species or in a combination of two or more species.

Examples of the rosin-based tackifier resin include rosins such as gum rosin, wood rosin and tall oil rosin as well as stabilized rosins (e.g. stabilized rosins obtained by disproportionation or hydrogenation of the rosins), polymerized rosins (e.g. multimers, typically dimers, of the rosins) and modified rosins (e.g. unsaturated acid-modified rosins obtained by modification with an unsaturated acid such as maleic acid, fumaric acid or (meth)acrylic acid).

Examples of the rosin derivative tackifier resin include esterification products of the rosin-based tackifier resins (e.g. rosin esters such as stabilized rosin esters and polymerized rosin esters), phenol modification products of the rosin-based resins (phenol-modified rosins) and their esterification products (phenol-modified rosin esters).

Examples of the petroleum-based tackifier resin include aliphatic petroleum resins, aromatic petroleum resins, copolymeric petroleum resins, alicyclic petroleum resins and their hydrogenation products.

Examples of the terpene-based tackifier resin include α-pinene resins, β-pinene resins, aromatic group-modified terpene-based resins, and terpene-phenol resins.

Examples of the ketone-based tackifier resin include ketone-based resins resulting from condensation of ketones (e.g. aliphatic ketones such as methyl ethyl ketone, methyl isobutyl ketone, acetophenone, etc.; alicyclic ketones such as cyclohexanone, methyl cyclohexanone, etc.) with formaldehyde.

In some embodiments of the PSA sheet disclosed herein, as the tackifier resin, one, two or more species can be preferably selected and used among a rosin-based tackifier resin, rosin derivative tackifier resin and terpene-phenol resin. Among them, a rosin derivative tackifier resin is preferable. Favorable examples include rosin esters such as stabilized rosin ester and polymerized rosin ester.

In a water dispersed PSA composition, it is preferable to use a water-dispersed tackifier resin in which the tackifier resin as described above is dispersed in water. For instance, a water dispersion of the acrylic polymer and a water-dispersed tackifier resin can be mixed to easily prepare a PSA composition that includes these components at a desirable ratio. In some embodiments, from the standpoint of concerns to environmental health, etc., as the water dispersed tackifier resin, a species essentially free of at least an aromatic hydrocarbon-based solvent can be preferably used. It is more preferable to use a water-dispersed tackifier resin essentially free of an aromatic hydrocarbon-based solvent and other organic solvents.

Examples of commercial products of water dispersed tackifier resins including rosin esters include trade names SUPER ESTER E-720, SUPER ESTER E-730-55, SUPER ESTER E-865NT, PENSEL D-125, PENSEL D-135, and PENSEL D-160 available from Arakawa Chemical Industries, Ltd.; and trade names HARIESTER SK-90D, HARIESTER SK-70D, HARIESTER SK-70E and NEOTALL 115E available from Harima Chemicals Group, Inc. Commercial products of terpene-phenol resin (possibly in a form of water-dispersed terpene-phenol resin) include TAMANOL E-100, TAMANOL E-200 and TAMANOL E-200NT available from Arakawa Chemical Industries, Ltd.

The softening point of the tackifier resin is not particularly limited. From the standpoint of inhibiting a decrease in cohesive strength of the PSA layer, it is usually preferable to use a tackifier resin having a softening point of 80° C. or higher. The softening point of the tackifier resin can be 90° C. or higher, 100° C. or higher, 110° C. or higher, or even 120° C. or higher. A tackifier resin having a softening point of 130° C. or higher, or 140° C. or higher can be used as well. From the standpoint of the transparency and the tightness of adhesion to adherend, a tackifier resin having a softening point of 200° C. or lower, or 180° C. or lower can be preferably used. As the softening point of a tackifier resin as referred to herein, the nominal value given in a reference or catalog can be used. If no nominal value is available, the softening point of the tackifier resin can be determined based on the softening point test method (ring and ball method) specified in JIS K5902 or JIS K2207.

From the standpoint of obtaining preferable effects of the use, usually, the amount of tackifier resin used is suitably 1 part by weight or greater to 100 parts by weight of the monomers forming the polymer included in the layer A; it can be 5 parts by weight or greater, 10 parts by weight or greater, 15 parts by weight or greater, 20 parts by weight or greater, or even 25 parts by weight or greater. From the standpoint of combining well-balanced cohesion and tightness of adhesion to adherend, the amount of tackifier resin used to 100 parts by weight of the monomers can be, for instance, 70 parts by weight or less, 50 parts by weight or less, or even 40 parts by weight or less. Alternatively, the layer A can be essentially free of a tackifier resin.

In the PSA sheet according to some embodiments, the water resistance reliability can be further enhanced by carrying out a process of increasing the water-peel strength when desired. The PSA sheet showing such a property can be made in, but not limited to, for instance, an embodiment where the layer A includes a tackifier resin. The process of increasing the water-peel strength may be, for instance, applying a temperature higher than the room temperature range after the PSA sheet is applied to an adherend. The temperature applied is not particularly limited and can be selected, considering the ease of working, cost effectiveness and convenience as well as heat resistance of the PSA sheet and the adherend, etc. The temperature may be 45° C. or higher, for instance, or 55° C. or higher. The temperature may be below 150° C., for instance, 120° C. or lower, 100° C. or lower, or even 80° C. or lower. The time for applying the temperature (heating time) is not particularly limited. For instance, it can be 1 hour or longer, 3 hours or longer, or even 1 day or longer. Alternatively, the temperature can be applied for a longer period as long as no significant thermal degradation occurs in the PSA sheet or adherend. In some embodiments, from the standpoint of facilitating the process, the time for applying the temperature can be, for instance, within 14 days, or even within 7 days. The temperature may be applied at once or at intervals.

With respect to the PSA sheet, the water-peel strength N3 after the process of increasing the water-peel strength can be, for instance, 2 times or more of the water-peel strength N2 determined by the aforementioned method, 5 times or more, 10 times or more, 20 times or more, or even 30 times or more. The water-peel strength N3 can be, for instance, 2.0 N/10 mm or greater, 3.0 N/10 mm or greater, or 4.0 N/10 mm or greater. The water-peel strength N3 is measured in the same manner as the measurement of water-peel strength N2 described above, except that the test sample removed from the autoclave is subjected to a process for increasing the water-peel strength.

The PSA composition used for forming the layer A may contain, as necessary, an acid or a base (aqueous ammonia, etc.) used for pH adjustment and so on. Examples of other optional components that can be contained in the composition include various additives generally used in the field of PSA compositions, such as viscosity-adjusting agent (e.g. thickener), leveling agent, plasticizer, filler, colorant including pigment and dye, etc., stabilizing agent, preservative, anti-aging agent, and so on. With respect to these various additives, those heretofore known can be used according to typical methods. Since these do not particularly characterize the present invention, details are omitted.

(2) Layer B

In addition to the layer A forming at least one surface of the PSA layer, the PSA layer of the PSA sheet disclosed herein may further include a layer B placed on the backside of the layer A. According to such a configuration with layers A and B, for instance, while the layer A provides good water-peeling properties, the layer B allows adjustment of the bulk properties (e.g. water resistance, cohesion, heat resistance, etc.) of the PSA layer. Accordingly, with the PSA layer that includes layers A and B, the resulting PSA sheet is likely to have good water-peeling properties and excellent water resistance reliability. For instance, a PSA sheet having a low water-resistant adhesive strength reduction rate and a high water-peel adhesive strength reduction rate (and/or a long water penetration distance) can be suitably obtained. It is also possible to favorably obtain, for instance, a PSA sheet that combines both high adhesiveness and good water-peeling properties at a high level.

The layer B may be placed in direct contact with the layer A's backside, or may be placed to include another layer between itself and the backside of the layer A. The other layer (or the middle layer, hereinafter) is typically a non-adhesive layer; and it is possible to use, similar to the support described later, for instance, a plastic film, a foam sheet, woven and nonwoven fabrics, paper, metal foil, etc. From the standpoint of the PSA sheet's flexibility and conformability to surface structures of the adherend, in some embodiments, it is preferable to employ a PSA layer having a configuration where the layer A and the layer B are layered in direct contact with each other (i.e. not via a middle layer).

For instance, the layer B can be formed to include one, two or more species of PSA selected among various known PSAs such as acrylic PSA, rubber-based PSA, silicone-based PSA, polyester-based PSA, urethane-based PSA, polyether-based PSA, polyamide-based PSA, and fluorine-based PSA. From the standpoint of the transparency, weatherability, etc., in some embodiments, an acrylic PSA can be preferably used as the layer B-forming material. The layer B-forming acrylic PSA can be selected among those exemplified as the acrylic PSA that can be used for the layer A so that desirable properties are obtained when used with the layer A. The layer B may have a single layer structure formed of one layer, or may have a multilayer structure including two or more layers having different compositions.

In some embodiments, the monomers forming the polymer (e.g. acrylic polymer) in the layer B may include a $C_{1-20}$ alkyl (meth)acrylate accounting for 40% by weight or more of the entire monomers. The ratio of $C_{1-20}$ alkyl (meth)acrylate in the entire monomers of the layer B can be, for instance, 98% by weight or lower. From the standpoint of increasing the cohesion of the layer B, it can be 95% by weight or lower, 85% by weight or lower, 70% by weight or lower, or even 60% by weight or lower.

The monomers forming the layer B may include a copolymerizable monomer along with the alkyl (meth)acrylate. The copolymerizable monomer can be suitably selected among those exemplified as the copolymerizable monomer that can be used in the layer A. The amount of copolymerizable monomer used can be, for instance, 5% by weight or more, 15% by weight or more, 30% by weight or more, or even 40% by weight or more of the entire monomers forming the layer B.

In some embodiments, the ratio of carboxy group-containing monomer in the monomers forming the layer B can be, for instance, 2% by weight or lower, 1% by weight or lower, or even 0.5% by weight or lower. A carboxy group-containing monomer may not be essentially used as a layer B-forming monomer. Here, that a carboxy group-containing monomer is not essentially used means that at least intentionally no carboxy group-containing monomer is used. The PSA sheet that has a layer B having such a composition is preferable because it tends to be highly reliable in water resistance.

A favorable example of the PSA sheet having layers A and B has a PSA layer that satisfies one or each of the following: the layer B has a gel fraction higher than that of the layer A; and the layer B has a lower degree of swelling than that of the layer A. According to such an embodiment, the resulting PSA sheet is likely to have a low water-resistant adhesive strength reduction rate and a high water-peel adhesive strength reduction rate (and/or a long water penetration distance).

In some embodiments, the layer B may be formed from a photocurable PSA composition or a solvent-based PSA composition. According to the layer B formed from such a composition, the resulting PSA sheet is likely to have good water resistance reliability. For instance, by combining a layer A formed from a water-dispersed PSA composition and a layer B formed from a photocurable PSA composition, or combining a layer A formed from a water-dispersed PSA composition and a layer B formed from a solvent-based PSA composition, it is possible to favorably bring about a PSA sheet having a low water-resistant adhesive strength reduction rate and a high water-peel adhesive strength reduction rate (and/or a long water penetration distance). In some embodiments, from the standpoint of improving water resistance, the layer B substantially not containing a hydrophilicity enhancer can be preferably employed.

<Support>

The PSA sheet according to some embodiments may be in a form of on-support PSA sheet including a support bonded to the other surface (backside) of the PSA layer. The material of support is not particularly limited and can be suitably selected in accordance with the purpose and application of the PSA sheet. Non-limiting examples of the support that may be used include plastic films including a polyolefin film whose primary component is a polyolefin such as polypropylene and ethylene-propylene copolymer, a polyester film whose primary component is polyester such as polyethylene terephthalate and polybutylene terephthalate, and a polyvinyl chloride film whose primary component is polyvinyl chloride; a foam sheet formed of a foam such as polyurethane foam, polyethylene foam and polychloroprene foam; woven and nonwoven fabrics of single or blended spinning of various fibrous materials (which may be natural fibers such as hemp and cotton, synthetic fibers such as polyester and vinylon, semi-synthetic fibers such as acetate, etc.); paper such as Japanese paper, high-quality paper, kraft paper and crepe paper; and metal foil such as aluminum foil and copper foil. The support may be formed of a composite of these materials. Examples of the support having such a composite structure include a support having a layered structure of metal foil and plastic film, and a plastic sheet reinforced with inorganic fibers such as glass cloth.

As the support of the PSA sheet disclosed herein, various kinds of film (or support film, hereinafter) can be preferably used. The support film can be a porous film such as a foam film and a non-woven fabric sheet, a non-porous film, or a film having a layered structure of porous and non-porous layers. In some embodiment, a preferable support film comprises a resin film capable of independently holding its shape (standing by itself or independently) as the base film. The "resin film" here means a resin film having a non-porous structure and is typically substantially free of air bubbles (void-less). Thus, the concept of resin film is distinct from foam films and non-woven fabrics. The resin film may have a monolayer structure or a multilayer structure with two or more layers (e.g. a three-layer structure).

Examples of the resin material forming the resin film include resins such as polyester; polyolefin; polycycloolefin derived from a monomer having an aliphatic ring structure such as a norbornene structure; polyamide (PA) such as nylon 6, nylon 66 and partially aromatic polyamide; polyimide (PI); polyamide-imide (PAI); polyether ether ketone (PEEK); polyether sulfone (PES); polyphenylene sulfide (PPS); polycarbonate (PC); polyurethane (PU); ethylene-vinyl acetate copolymers (EVA); polystyrene; polyvinyl chloride; polyvinylidene chloride; fluororesin such as polytetrafluoroethylene (PTFE); acrylic resin such as polymethyl methacrylate; cellulose-based polymer such as diacetyl cellulose and triacetyl cellulose; vinyl butyral-based polymer; arylate-based polymer; polyoxymethylene-based polymer; and epoxy-based polymer. The resin film may be formed from a resin material containing one species of such resin alone or a resin material in which two or more species are blended. The resin film may be non-stretched or stretched (e.g. uniaxially stretched or biaxially stretched).

Favorable examples of the resin material forming the resin film include polyester resins, PPS resins and polyolefin resins. Here, the polyester resin refers to a resin containing more than 50% polyester by weight. Similarly, the PPS resin refers to a resin containing more than 50% PPS by weight and the polyolefin resin refers to a resin containing more than 50% polyolefin by weight.

As the polyester resin, it is typical to use a polyester-based resin whose primary component is a polyester obtainable by polycondensation of a dicarboxylic acid and a diol. Specific examples of the polyester resin include polyethylene terephthalate (PET), polybutylene terephthalate (PBT), polyethylene naphthalate (PEN), and polybutylene naphthalate.

As the polyolefin resin, solely one species of polyolefin or a combination of two or more species of polyolefin can be used. Examples of the polyolefin include an α olefin homopolymer, a copolymer of two or more species of α-olefin, and a copolymer of one, two or more species of a olefin and another vinyl monomer. Specific examples include polyethylene (PE), polypropylene (PP), poly-1-butene, poly-4-methyl-1-pentene, ethylene-propylene copolymers such as ethylene propylene rubber (EPR), ethylene-propylene-butene copolymers, ethylene-butene copolymers, ethylene-vinyl alcohol copolymers and ethylene-ethyl acrylate copolymers. Either a low-density (LD) polyolefin or a high-density (HD) polyolefin can be used. Examples of the polyolefin resin include non-stretched polypropylene (CPP) film, biaxially-stretched polypropylene (OPP) film, low-density polyethylene (LDPE) film, linear low-density polyethylene (LLDPE) film, medium-density polyethylene (MDPE) film, high-density polyethylene (HDPE) film, polyethylene (PE) film in which two or more species of polyethylene (PE) are blended, PP/PE blend film in which polypropylene (PP) and polyethylene (PE) are blended.

Specific examples of the resin film that may be preferably used as the support include PET film, PEN film, PPS film, PEEK film, CPP film and OPP film. Preferable examples in view of the strength include PET film, PEN film, PPS film and PEEK film. From the standpoint of the availability, size stability, optical properties, etc., a preferable example is PET film.

The resin film may include, as necessary, known additives such as photo stabilizer, antioxidant, antistatic agent, colorant (dye, pigment, etc.), fillers, slip agent and anti-blocking agent. The amount of an additive is not particularly limited and can be suitably selected according to the application of the PSA sheet, etc.

The method for producing the resin film is not particularly limited. For instance, heretofore known general resin film formation methods can be suitably employed, such as extrusion molding, inflation molding, T-die casting and calendar rolling.

The support may be substantially formed from such resin film. Alternatively, the support may include a secondary layer in addition to the resin film. Examples of the secondary layer include a layer for adjusting optical properties (such as a colored layer and an antireflection layer), a print layer and laminate layer to provide a desirable appearance to the support or to the PSA sheet, a treated surface layer such as an antistatic layer, a primer layer, and a release layer. The support can also be an optical member described later.

The thickness of the support is not particularly limited and can be suitably selected in accordance with the purpose and application of the PSA sheet. The support's thickness is usually suitably, for instance, 1000 µm or less, 500 µm or less, 100 µm or less, 70 µm or less, 50 µm or less, 25 µm or less, 10 µm or less, or even 5 µm or less. With decreasing thickness of the support, the PSA sheet's flexibility and conformability to surface structures of adherends tend to improve. From the standpoint of the ease of handling, processing and so on, the support's thickness can be, for instance, 2 µm or greater, greater than 5 µm, or even greater than 10 µm. In some embodiments, the support's thickness can be, for instance, 20 µm or greater, 35 µm or greater, or even 55 µm or greater.

Of the support, the face on the side to be bonded to the PSA layer may be subjected as necessary to a heretofore known surface treatment such as corona discharge treatment, plasma treatment, UV irradiation, acid treatment, alkali treatment, primer coating, and antistatic treatment.

These surface treatments may increase the tightness of adhesion between the support and the PSA layer, that is, the anchoring of the PSA layer to the support. The composition of the primer is not particularly limited and can be suitably selected among known species. The thickness of the primer layer is not particularly limited and is usually suitably about 0.01 µm to 1 µm, or preferably about 0.1 µm to 1 µm.

Of the support, the backside (or the face on the reverse side of the side to be bonded to the PSA layer) may be subjected as necessary to a heretofore known surface treatment such as release treatment, treatment to enhance bonding ability or adhesiveness, and antistatic treatment. For instance, by treating the backside of the support with a release agent, the unwinding force of the PSA sheet in a rolled form can be reduced. As the release agent, it is possible to use a silicone-based release agent, long-chain alkyl release agent, olefinic release agent, fluorine-based release agent, aliphatic amide-based release agent and molybdenum sulfide, silica powder and the like.

<PSA Sheet>

The PSA layer constituting the PSA sheet disclosed herein may be a cured layer of the PSA composition. In other words, the PSA layer can be formed by providing (e.g. applying) the PSA composition to a suitable surface and then subjecting it to a suitable curing process. When two or more different curing processes (drying, crosslinking, polymerization, etc.) are carried out, these can be done at the same time or in stages. When a partial polymer (acrylic polymer syrup) of the monomers is used for the PSA composition, a final copolymerization reaction is typically carried out as the curing process. That is, the partial polymer is subjected to a further copolymerization reaction to form a fully polymerized product. For instance, with respect to a photocurable PSA composition, photoirradiation is carried out. As necessary, curing processes such as crosslinking and drying can be performed. For instance, with respect to a photocurable PSA composition that needs to be dried, photocuring is carried out preferably after drying. With respect to a PSA composition using a fully polymerized product, processes such as drying (drying with heat) and crosslinking are typically carried out as necessary as the curing process. The PSA layer having a multilayer structure with two or more layers can be prepared by adhering pre formed PSA layers together. Alternatively, it can be prepared by applying a PSA composition onto a pre formed first PSA layer and allowed to cure to form a second PSA layer.

The PSA composition can be applied with, for example, a conventional coater such as a gravure roll coater, a reverse roll coater, a kiss-roll coater, a dip roll coater, a bar coater, a knife coater and a spray coater. With respect to a PSA sheet having a support, as the method for providing a PSA layer onto the support, it is possible to use a direct method where the PSA composition is directly provided to the support or a transfer method where a PSA layer formed on a release face is transferred to the support.

The thickness of the PSA layer is not particularly limited. It can be, for instance, about 3 µm to 1000 µm. From the standpoint of enhancing the reliability of water resistance by forming tight adhesion between the PSA layer and adherend, in some embodiments, the thickness of the PSA layer can be, for instance, 5 µm or greater, 10 µm or greater, 20 µm or greater, 30 µm or greater, 50 µm or greater, greater than 50 µm, 70 µm or greater, 100 µm or greater, or even 120 µm or greater. From the standpoint of preventing the occurrence of leftover adhesive residue due to cohesive failure of the PSA layer, in some embodiments, the thickness of the PSA layer can be, for instance, 500 µm or less, 300 µm or less, 200 µm or less, or even 170 µm or less. The art disclosed herein can also be favorably implemented as a PSA sheet whose PSA layer has a thickness of 130 µm or less, 90 µm or less, 60 µm or less, or 40 µm or less. It is noted that in a PSA layer consisting a layer A, the thickness of the PSA layer means the thickness of the layer A.

With increasing thickness of PSA layer, it generally tends to be more difficult to combine water-peeling properties and water resistance reliability. From such a standpoint, in an embodiment where the PSA layer's thickness is, for instance, greater than 50 µm, it is preferable to employ a configuration with the PSA layer including layers A and B. According to the PSA layer having such a configuration, even if the PSA layer becomes thick, the resulting PSA sheet is likely to combine water peeling properties and water resistance reliability at a high level.

In the embodiment where the PSA layer includes layers A and B, the layer A may have a thickness of, for instance, 1 µm or greater, 2 µm or greater, 4 µm or greater, 5 µm or greater, 10 µm or greater, or even 15 µm or greater. The thickness of the layer A may be, for instance, 50 µm or less, 45 µm or less, 35 µm or less, or even 25 µm or less. In particular, in an embodiment having a layer A formed from a water-dispersed PSA composition or in an embodiment where the layer A includes a hydrophilicity enhancer, it is also preferable that the layer A's thickness is not too large from the standpoint of increasing the water resistance of the PSA sheet and the transparency of the PSA layer, etc.

In the embodiment in which the PSA layer includes layers A and B, the layer B may have a thickness of, for instance, 5 µm or greater, or even 10 µm or greater. From the standpoint of obtaining greater effect of the layer B provided to the backside of the layer A, in some embodiments, the layer B may have a thickness of, for instance, 20 µm or greater, 30 µm or greater, or 50 µm or greater, 70 µm or greater, or even 100 µm or greater.

In the embodiment in which the PSA layer includes layers A and B, the layer A's thickness in the total thickness of the PSA layer can be, for instance, 90% or less; and it is usually preferably 70% or less. 50% or less, 30% or less, 20% or less, or even 15% or less. From the standpoint of the ease of layer A formation and water-peeling properties of the PSA sheet, in some embodiments, the layer A's thickness in the total thickness of the PSA layer can be, for instance, 3% or greater, It may be 5% or greater, 7% or greater, or 10% or greater.

<Applications>

The PSA sheet disclosed herein is highly reworkable as it can be easily peeled off an adherend using an aqueous liquid such as water, and has highly reliable water resistance as well; for these features, it can be used in an embodiment where it is applied to members constituting various portable devices, automobiles, home electric appliance and the like, for purposes such as fixing, bonding, shaping, decorating, protecting, and supporting these members. The material forming at least the surface of the member can be, for instance, glass such as an alkaline glass or non-alkaline glass; resin film; metals such as stainless steel (SUS) and aluminum; resin materials such as acrylic resin, ABS resin, polycarbonate resin, and polystyrene resin. The PSA sheet disclosed herein can be applied to a surface coated with an acrylic paint or a paint based on polyester, alkyd, melamine, urethane, acid/epoxy crosslinking, or their composite (e.g. acrylic melamine paint, alkyd melamine paint); or it can also be applied to a plated surface such as a galvanized steel sheet. The PSA sheet disclosed herein can be, for instance, a component of a PSA sheet-bearing member in which such a member is bonded to the layer A side of the PSA sheet.

In such a PSA sheet-bearing member, the member's surface (or bonding face, hereinafter) in contact with the PSA layer may have hydrophilicity of showing a contact angle with distilled water of about, for instance, 60° or less, or preferably 50° or less. In some embodiments, the contact angle of the bonding face can be, for instance, 45° or less, 40° or less, 35° or less, or even 30° or less. A small contact angle of the bonding face facilitates water to wet and spread over the bonding face and the PSA sheet tends to have greater water-peeling properties. This is preferable from the standpoint of facilitating reworking of application of the PSA sheet to the bonding face to prepare the PSA sheet-bearing member. If the contact angle of the bonding face is equal to or smaller than any of the aforementioned angles at least around when the PSA sheet is applied (e.g. 30 minutes before application), the contact angle up to the prescribed degrees may produce the rework facilitation effect. The minimum contact angle is theoretically 0°. In some embodiments, the contact angle of the bonding face may be greater than 0°, 1° or greater, 3° or greater, or even 5° or greater. The contact angle of the bonding face of the member is determined in the same manner as the contact angle of the alkaline glass plate described above.

The bonding face of the member may be hydrophilized to reduce the contact angle with distilled water. The hydrophilization treatment can be, for instance, a treatment that contributes to an increase in hydrophilicity, such as corona treatment, plasma treatment, and hydrophilic coating to form a hydrophilic coating layer. The systems and treatment conditions employed for such as corona treatment and plasma treatment can be selected so as to obtain a bonding face that shows a desirable contact angle based on heretofore known techniques. The hydrophilic coating layer can be formed by a typical method with a coating agent suitably selected among known species to obtain a bonding face that shows a desirable contact angle. The hydrophilic coating layer may have a thickness of, for instance, 0.01 µm or greater, 0.05 µm or greater, or even 0.1 µm or greater; and, for instance, 10 µm or less, 5 µm or less, or even 2 µm or less.

An example of preferable applications is an optical application. More specifically, for instance, the PSA sheet disclosed herein can be preferably used as an optical PSA sheet used for bonding optical members (for optical member bonding) or for manufacturing a product (optical product) in which the optical members are used.

The optical member refers to a member having optical properties (e.g. polarizability, light refractivity, light scattering properties, light reflectivity, light transmission, light absorption, light diffraction, optical rotation, visibility, etc.). The optical member is not particularly limited as long as it has optical properties. Examples include components of a device (optical device) such as a display device (an image display unit) and an input device as well as a member used for these devices, for instance, a polarizing plate, waveplate, retardation plate, optical compensation film, glaring film, light guide plate, reflective film, anti-reflection film, hard coat (HC) film, impact-absorbing film, anti fouling film, photochromic film, light control film, transparent conductive film (ITO film), design film, decorative film, surface protection plate, prism, lens, color filter, transparent substrate, and laminates of these (or collectively referred to as "functional films"). The "plate" and "film" individually encompass forms of plate, film, sheet, etc. For instance, the "polarizing film" encompasses a "polarizing plate", "polarizing sheet" and the like.

Examples of the display device include a liquid crystal display device, organic EL (electroluminescence) display device, PDP (plasma display panel), and electronic paper. Examples of the input device include a touch panel.

While no particular limitations are imposed, examples of the optical member include members (e.g. members in a form of sheets, films or plates) formed of glass, acrylic resin, polycarbonate, polyethylene terephthalate, metal foil, etc. As used herein, the "optical member" includes a member (design film, decoration film, surface protective film, etc.) that serves to provide decoration or protection while maintaining the visibility of a display device or an input device.

There are no particular limitations to how optical members are bonded using the PSA sheet disclosed herein. Examples of a possible embodiment include (1) optical members are bonded to each other via the PSA sheet disclosed herein, (2) an optical member is bonded to a non-optical member via the PSA sheet disclosed herein, and (3) the PSA sheet disclosed herein is in an embodiment including an optical member and is bonded to an optical or non-optical member. In the embodiment (3), the optical member-containing PSA sheet can be, for instance, a PSA sheet whose support is the optical member (e.g. optical film). Such a PSA sheet including an optical member as the support can be thought as an adhesive optical member (e.g. adhesive optical film). When the PSA sheet disclosed herein has a support and the functional film is used as the support, the PSA sheet disclosed herein can also be thought as "adhesive functional film" having the PSA layer disclosed herein on at least one face of the functional film.

<Peeling Method>

This Description provides a method for peeling a PSA sheet adhered to an adherend. The peeling method include a water-peel step in which the PSA sheet is peeled from the adherend, in a state where an aqueous liquid exits at the interface between the adherend and the PSA sheet at the front line of peeling the PSA sheet from the adherend, with the aqueous liquid allowed to further enter the interface following the movement of the peel front line. According to the water peel step, the PSA sheet can be peeled from the adherend with effective use of the aqueous liquid. As the aqueous liquid, water or a mixed solvent primarily comprising water with a small amount of an additive as necessary can be used. As for other solvents forming the mixed solvent besides water, a lower alcohol (e.g. ethanol), lower ketone (e.g. acetone) and the like that are miscible with water can be used. As the additives, known surfactants and the like can be used. From the standpoint of avoiding contamination of the adherend, in some embodiments, an aqueous liquid essentially free of additives can be preferably used. From the standpoint of environmental health, it is particularly preferable to use water as the aqueous liquid. The water is not particularly limited. For instance, distilled water, ion-exchanged water, tap water or the like can be used in view of the purity, availability, etc., required for the application.

In some embodiments, as in the measurement of water peel strength N2, for instance, the peeling method can be preferably practiced in an embodiment where the aqueous liquid is supplied onto the adherend (near an edge of the PSA sheet adhered to the adherend); and after the aqueous liquid is allowed, through the edge, to enter the interface between the PSA sheet and the adherend, peeling of the PSA sheet is allowed to proceed without another supply of water (i.e. by using only the aqueous liquid supplied onto the adherend before the peel initiation). During the water-peel step, if the water entering the interface between the PSA sheet and the adherend following the movement of the peel front line runs out in the middle of peeling, additional water may be supplied intermittently or continuously after the start of the water peel step. For instance, in cases where the adherend absorbs water, the aqueous liquid tends to remain on the post-peel adherend surface or the adhesive face, etc., it may be preferable to employ the embodiment where additional water is supplied after the start of the water-peel step.

The amount of aqueous liquid supplied before the start of peeling is not particularly limited as long as the aqueous liquid can be introduced from the outside of the PSA sheet's bonding area into the interface between the PSA sheet and the adherend. The amount of the aqueous liquid can be, for instance, 5 μL or greater, usually 10 μL or greater, or even 20 μL or greater. There are no particular limitations to the maximum amount of the aqueous liquid. In some embodiments, from the standpoint of facilitating the work, the amount of the aqueous liquid can be, for instance, 10 mL or less, 5 mL or less, 1 mL or less, 0.5 mL or less, 0.1 mL or less, or even 0.05 mL or less. By reducing the amount of the aqueous liquid, it is possible to omit or simplify removal of the aqueous liquid by drying, wiping, etc., after the PSA sheet is peeled off.

At the start of peeling, the procedure for allowing the aqueous liquid to enter the PSA sheet/adherend interface through an edge of the PSA sheet can be carried out, for instance, by ways of: inserting the tip of a tool such as cutting knife or needle into the interface at the edge of the PSA sheet; scratching the edge and lifting an end of the PSA sheet with a sort of hook or fingernail; lifting an end of the PSA sheet by sticking a sort of PSA tape or sucker to the PSA sheet's backside near the edge, and so on. By thus forcing the aqueous liquid to enter the interface through the edge of the PSA sheet, it is possible to efficiently form a state having the aqueous liquid at the interface between the adherend and the PSA sheet. Good water-peeling properties following the peel initiation with a procedure of forced entry of the aqueous liquid into the interface to trigger peeling can be favorably combined with highly reliable water resistance obtainable in the absence of such procedure.

Preferably, the PSA sheet to be peeled by the peeling method includes a PSA layer, and of the PSA layer, at least the layer A forming the adherend side surface is preferably formed with a PSA comprising a hydrophilicity enhancer. For instance, the PSA sheet is preferably a PSA sheet disclosed herein. Thus, the peeling method is suitable as a method for peeling a PSA sheet disclosed herein.

The water-peel step according to some embodiments can be preferably implemented in an embodiment where the peel front line is allowed to move at a speed of at least 10 mm/min. Moving the peeling front line at a speed of at least 10 mm/min is comparable to peeling the PSA sheet at a tensile speed of at least 20 mm/min, for instance, when the peel angle is 180°. The speed for moving the peeling front line can be, for instance, 50 mm/min or higher, 150 mm/min or higher, 300 mm/min or higher, or 500 mm/min or higher. According to the peeling method disclosed herein, the PSA sheet is peeled off from the adherend while allowing the aqueous liquid to enter the interface; and this can bring about good water-peeling properties even at a relatively high peeling speed. The maximum speed at which the peel front line moves is not particularly limited. The speed at which the peel front line moves can be, for instance, 1000 mm/min or lower.

The peeling method disclosed herein can be practiced, for instance, in an embodiment where the peeling area of PSA sheet per 10 μL volume of aqueous liquid (e.g. water) used in the method is, for instance, 50 cm$^2$ or larger, or preferably 100 cm$^2$ or larger.

The peeling method disclosed herein can be preferably applied to peeling of a PSA sheet adhered to a non-water-absorbing smooth surface such as a glass plate, a metal plate and a resin plate. The peeling method disclosed herein can be preferably employed as a method for peeling a PSA sheet from an aforementioned optical member. In particular, it is suitable as a method for peeling the PSA sheet adhered on a glass plate, such as alkaline glass and non-alkaline glass.

Matters disclosed by this Description include the following:

(1) A PSA sheet having a PSA layer, wherein
the PSA layer comprises a layer A forming at least one surface of the PSA layer; and
the PSA sheet has:
an adhesive strength N0 of 2.0 N/10 mm or greater, after one day at room temperature following application of the layer A side to a surface of an adherend,
a water resistant adhesive strength reduction rate of 30% or lower, determined by the next formula $(1-(N1/N0))\times 100$ based on its water-resistant adhesive strength N1 (N/10 mm) and the adhesive strength N0 (N/10 mm), wherein N1 is measured after the layer A side is applied to an adherend, and the resultant is stored at room temperature for one day, immersed in water for 30 minutes, taken out from the water and then residual water is wiped off, and
a water-peel adhesive strength reduction rate of 40% or higher, determined by the next formula $(1-(N2/N0))\times 100$ based on its water-peel strength N2 (N/10 mm) and the adhesive strength N0 (N/10 mm), wherein N2 is measured after the layer A side is applied to an adherend, stored at room temperature for one day, a drop of water is dropped onto the adherend and the water is allowed to enter an interfacial edge between the PSA layer and the adherend.

(2) The PSA sheet according to (1) above, the layer A comprises a hydrophilicity enhancer.

(3) The PSA sheet according to (2) above, wherein the hydrophilicity enhancer is included in an amount of at least 0.2 part by weight up to 20 parts by weight relative to 100 parts by weight of monomers forming a polymer included in the layer A.

(4) The PSA sheet according to any of (1) to (3), wherein the layer A is preferably water-insoluble and non-water-swellable.

(5) The PSA sheet according to any of (1) to (4), wherein the layer A is formed with an acrylic PSA comprising an acrylic polymer, and
at least 50% by weight of monomers forming the acrylic polymer is an alkyl (meth)acrylate having an alkyl group with 1 to 20 carbon atoms at its ester terminus.

(6) The PSA sheet according to any of (1) to (5) above, wherein the PSA layer has a thickness of 10 μm or greater and 200 μm or less.

(7) The PSA sheet according to any of (1) and (6), wherein the PSA layer further comprises a layer B placed on the backside of the layer A.

(8) The PSA sheet according to (7), wherein the layer B is placed in direct contact with the backside of the layer A.

(9) The PSA sheet according to (7) or (8) above, wherein the layer B has a thickness of 20 μm or greater.

(10) The PSA sheet according to any of (7) to (9) above, wherein the layer A has a thickness of 5 μm or greater and 50 μm or less.

(11) The PSA sheet according to any of (7) to (10) above, wherein
the layer A is a layer formed from a water-dispersed PSA composition, and
the layer B is a layer formed from a photocurable PSA composition or a solvent-based PSA composition.
(12) A PSA sheet having a PSA layer, wherein
the PSA layer comprises a layer A forming at least one surface of the PSA layer, and a layer B placed on the backside of the layer A,
the layer A is a layer formed from a water dispersed PSA composition, and
the layer B is a layer formed from a photocurable PSA composition or a solvent-based PSA composition.
(13) A PSA sheet having a PSA layer, wherein
the PSA layer comprises a layer A forming at least one surface of the PSA layer, and a layer B placed on the backside of the layer A, and
the layer A comprises a hydrophilicity enhancer.
(14) The PSA sheet according to (13) above, wherein the hydrophilicity enhancer is included in an amount of at least 0.2 part by weight up to 20 parts by weight relative to 100 parts by weight of monomers forming a polymer included in the layer A.
(15) The PSA sheet according to (12) to (14) above, wherein the layer A is water-insoluble and non-water-swellable.
(16) The PSA sheet according to any of (12) to (15), having
a water-resistant adhesive strength reduction rate of 30% or lower, determined by the next formula $(1-(N1/N0))\times 100$ based on its water-resistant adhesive strength N1 (N/10 mm) and the adhesive strength N0 (N/10 mm), wherein N1 is measured after the layer A side is applied to an adherend, and the resultant is stored at room temperature for one day, immersed in water for 30 minutes, taken out from the water and then residual water is wiped off, and
a water-peel adhesive strength reduction rate of 40% or higher, determined by the next formula $(1-(N2/N0))\times 100$ based on its water-peel strength N2 (N/10 mm) and the adhesive strength N0 (N/10 mm), wherein N2 is measured after the layer A side is applied to an adherend, stored at room temperature for one day, a drop of water is dropped onto the adherend, the water is allowed to enter an interfacial edge between the PSA layer and the adherend, and the PSA sheet is peeled without additional supply of water.
(17) The PSA sheet according to any of (12) to (16) above, having an adhesive strength N0 of 2.0 N/10 mm or greater, after one day at room temperature following application of the layer A side to an adherend.
(18) The PSA sheet according to any of (12) to (17) above, wherein the layer B is placed in direct contact with the backside of the layer A.
(19) The PSA sheet according to any of (12) to (18) above, wherein the layer B has a thickness of 20 μm or greater.
(20) The PSA sheet according to any of (12) to (19) above, wherein the layer A has a thickness of 5 μm or greater and 50 μm or less.
(21) The PSA sheet according to any of (12) to (20) above, wherein
the layer A is formed with an acrylic PSA comprising an acrylic polymer, and
at least 50% by weight of monomers forming the acrylic polymer is an alkyl (meth)acrylate having an alkyl group with 1 to 20 carbon atoms at its ester terminus.

(22) The PSA sheet according to any of (12) and (21) above, wherein the PSA layer has a thickness of 10 μm or greater and 200 μm or less.
(23) A PSA sheet-bearing member comprising the PSA sheet according to any of (1) to (22) above, and a member bonded to the one surface of the PSA layer.
(24) The PSA sheet-bearing member according to (23) above, wherein the member's surface in contact with the PSA layer has a contact angle of 50° or smaller with distilled water.
(25) A method for peeling a PSA sheet adhered on an adherend, the method including a water-peel step in which the PSA sheet is peeled from the adherend, in a state where an aqueous liquid exits at the interface between the adherend and the PSA sheet at the front line of peeling the PSA sheet from the adherend, while the aqueous liquid is allowed to further enter the interface following the movement of the peel front line.
(26) The peeling method according to (25) above, wherein the PSA sheet is the PSA sheet according to any of (1) to (22) above.
(27) The peeling method according to (25) or (26) above, wherein the peel front line is moved at a speed of at least 10 mm/min in the water-peel step.
(28) The PSA sheet-bearing member according to any of (25) to (27) above, wherein the adherend's surface in contact with the PSA layer has a contact angle of 50° or smaller with distilled water.
(29) A method for producing a PSA sheet-bearing member, the method including
a step of peeling a PSA sheet from a member as an adherend by the peeling method according to any of (25) to (28) above, and
a step of applying, to the member from which the PSA sheet has been peeled off, a PSA sheet different from the peeled PSA sheet.

EXAMPLES

Several working examples related to the present invention are described below, but these specific examples are not to limit the present invention. In the description below, "parts" and "%" are by weight unless otherwise specified.

<<Experiment 1>>
<Preparation of PSA Composition>
(PSA Composition U-1)
Into a 4-necked flask, were placed 100 parts of a monomer mixture containing 2-ethylhexyl acrylate (2EHA), N-vinyl-2-pyrrolidone (NVP), 2-hydroxyethyl acrylate (HEA) and isobornyl acrylate (IBXA) at a weight ratio of 80/35/5/30 along with 0.05 part of product name IRGACURE 651 (available from Ciba Specialty Chemicals, Inc.) and 0.05 part of product name IRGACURE 184 (available from Ciba Specialty Chemicals, Inc.) as photopolymerization initiators. Under a nitrogen atmosphere, the reaction mixture was irradiated with UV rays and photopolymerization was carried out to a viscosity of about 15 Pa's (BH viscometer, No. 5 rotor, 10 rpm, measurement temperature 30° C.) to prepare a monomer syrup containing a partial polymer of the monomer mixture.

To 100 parts of the monomer syrup, were added and uniformly mixed 0.13 part of 1,6-hexanediol diacrylate (HDDA) and 0.33 part of photopolymerization initiator (product name IRGACURE 651 available from Ciba Specialty Chemicals, Inc.) to prepare a UV ray curable PSA composition U-1.

(PSA Composition U-2)

Into a 4-necked flask, were placed 100 parts of a monomer mixture containing n-butyl acrylate (BA), cyclohexyl acrylate (CHA), NVP, 4-hydroxybutyl acrylate (4HBA) and isostearyl acrylate (ISTA) at a weight ratio of 70/10/10.5/15/21.1 along with 0.05 part of product name IRGACURE 651 (available from Ciba Specialty Chemicals, Inc.) and 0.05 part of product name IRGACURE 184 (available from Ciba Specialty Chemicals, Inc.) as photopolymerization initiators. Under a nitrogen atmosphere, the reaction mixture was irradiated with UV rays and photopolymerization was carried out to a viscosity of about 15 Pa's (BH viscometer, No. 5 rotor, 10 rpm, measurement temperature 30° C.) to prepare a monomer syrup containing a partial polymer of the monomer mixture.

To 100 parts of the monomer syrup, were added and uniformly mixed 0.4 part of HDDA, 0.4 part of photopolymerization initiator (product name IRGACURE 651 available from Ciba Specialty Chemicals, Inc.) and 0.08 part of α-methylstyrene dimer (NOFMER MSD available from NOF Corporation) as chain transfer agent to prepare a UV ray-curable PSA composition U-2.

(PSA Composition S-1)

Into a reaction vessel equipped with a condenser, nitrogen inlet, thermometer and stirrer, were placed 98 parts of BA, 1 part of HEA and 1 part of acrylic acid (AA) along with 0.3 part of 2,2'-azobisisobutyronitrile (AIBN) as a thermal polymerization initiator and ethyl acetate as the polymerization solvent. Under a nitrogen gas flow, the reaction was carried out at 60° C. for 4 hours to obtain a solution (30% NV (non-volatiles)) containing an acrylic polymer of Mw $180 \times 10^4$. To 100 parts of non-volatiles in the acrylic polymer solution, were added and uniformly mixed with stirring 0.3 part of benzoyl peroxide (NYPER BO-Y available from NOF Corporation), 0.02 part of trimethylolpropane/tolylene diisocyanate trimer adduct (CORONATE L available from Tosoh Corporation) and 0.1 part of silane coupling agent (3-glycidoxypropyltrimethoxysilane) to prepare a solvent-based PSA composition S-1.

(PSA Composition S-2)

Into a reaction vessel equipped with a condenser, nitrogen inlet, thermometer and stirrer, were placed 95 parts of BA, 50 parts of 2EHA and 5 parts of AA along with 0.2 part of AIBN as a thermal polymerization initiator and 233 parts of ethyl acetate as the polymerization solvent. Under a nitrogen gas flow, the reaction was carried out at 60° C. for 8 hours to obtain a solution containing an acrylic polymer of Mw $70 \times 10^4$. To 100 parts of non-volatiles in the acrylic polymer solution, were added and uniformly mixed with stirring 25 parts of rosin ester resin (PENSEL D-125 available from Arakawa Chemical Industries, Ltd.) as tackifier resin and 2 parts of trimethylolpropane/tolylene diisocyanate trimer adduct (CORONATE L available from Tosoh Corporation) as crosslinking agent to prepare a solvent-based PSA composition S-2.

(PSA Composition E-1)

In 100 parts of ion-exchanged water, were mixed and emulsified 85 parts of 2EHA, 13 parts of MA, 1.2 parts of AA, 0.8 part of MAA, 0.02 part of (3-methacryloxypropyl)trimethoxysilane (KBM-503 available from Shin-Etsu Chemical Co., Ltd.), 0.048 part of t-dodecyl mercaptan as chain transfer agent and 2.0 part of emulsifier (LATEML E-118B available from Kao Corporation) to prepare an aqueous emulsion of the monomer mixture (monomer emulsion).

Into a reaction vessel equipped with a condenser, nitrogen inlet, thermometer and stirrer, was placed the monomer emulsion. While nitrogen gas is introduced, the resulting mixture was allowed to stir at room temperature for at least one hour. Subsequently, the system was heated to 60° C. and was added 0.1 part of 2,2'-azobis[N-(2-carboxyethyl)-2-methylpropionamidine] hydrate (VA-057 available from Wako Pure Chemical Industries, Ltd.) as polymerization initiator. The reaction was carried out at 60° C. for 6 hours to obtain a water dispersion of acrylic polymer. After the system was cooled to room temperature, using 10% aqueous ammonia as pH-adjusting agent and polyacrylic acid (aqueous solution of 36% non-volatiles) as thickener, the pH was adjusted to about 7.5 and the viscosity to about 9 Pa's to prepare an emulsion-based PSA composition E-1.

(PSA Composition E-2)

To 100 parts of non-volatiles in the water dispersion of acrylic polymer obtained in the preparation of PSA composition E-1, was added 30 parts (non-volatiles) of tackifier resin emulsion (SUPER ESTER E-865NT available from Arakawa Chemical Industries, Ltd.; a water dispersion of polymerized rosin ester having a softening point of 160° C.).

Using 10% aqueous ammonia as pH-adjusting agent and polyacrylic acid (aqueous solution of 36% non-volatiles) as thickener, the pH was adjusted to about 7.5 and the viscosity to about 9 Pas to prepare an emulsion-based PSA composition E-2.

<PSA Sheet Preparation (1)>

Example 1

To a 38 μm thick release film R1 (MRF #38, Mitsubishi Plastics, Inc.) having a release face on one side of polyester film, PSA composition U-1 was applied and covered with a 38 μm thick release film R2 (MRE #38, Mitsubishi Plastics, Inc.) having a release face on one side of polyester film to block air. The resultant was allowed to cure by UV irradiation to form a 130 μm thick PSA layer B1. Subsequently, release film R2 covering PSA layer B1 was removed and the exposed surface was adhered to a 75 μm thick corona-treated polyethylene terephthalate (PET) film to obtain a laminate sheet with the PET film (support), PSA layer B1 and release film R1 layered in this order.

To release film R1 (MRF #38, Mitsubishi Plastics, Inc.), PSA composition E-1 was applied and allowed to dry at 120° C. for 3 minutes to form a 20 μm thick PSA layer A1. Release film R1 covering PSA layer B1 of the laminate sheet was removed. To the exposed surface, PSA layer A1 was adhered to obtain a PSA sheet in an embodiment including a PSA layer having a two-layer structure with PSA layers A1 and B1 layered in direct contact with each other, with the PET film (support) bonded to the layer B1 side surface of the PSA layer. The layer A1 side surface of the PSA sheet is protected with release film R1 used in forming the PSA layer A1.

Example 2

In place of PSA composition E-1, was used PSA composition E-2. Otherwise in the same manner as Example 1, was prepared a PSA sheet according to this Example.

Example 3

To release film R1 (MRF #38, Mitsubishi Plastics, Inc.), PSA composition S-2 was applied and allowed to dry at 130° C. for 5 minutes to form a 50 μm thick PSA layer B3. To PSA layer B3, was adhered a 75 μm thick corona-treated PET film to obtain a laminate sheet with the PET film (support), PSA layer B3 and release film R1 layered in this order.

Release film R1 covering PSA layer B3 of the laminate sheet was removed. To the exposed surface, was adhered a 20 μm thick PSA layer A1 formed on the release face of release film R1 in the same manner as Example 1 to obtain a PSA sheet in an embodiment including a PSA layer having a two-layer structure with PSA layers A1 and B3 layered in direct contact with each other, with the PET film (support) bonded to the layer B3 side surface of the PSA layer.

Example 4

In place of PSA composition E-1, was used PSA composition S-1. Otherwise in the same manner as Example 1, was prepared a PSA sheet according to this Example.

Example 5

To release film R1 (MRF #38, Mitsubishi Plastics, Inc.), PSA composition U-1 was applied and covered with release film R2 (MRE #38, Mitsubishi Plastics, Inc.) to block air. The resultant was allowed to cure by UV irradiation to form a 150 μm thick PSA layer B5. Subsequently, release film R2 covering PSA layer B5 was removed and the exposed surface was adhered to a 75 μm thick corona-treated polyethylene terephthalate (PET) film to obtain a laminate sheet with the PET film (support), PSA layer and release film R1 layered in this order.

Example 6

To release film R1 (MRF #38, Mitsubishi Plastics, Inc.), PSA composition S-2 was applied and allowed to dry at 130° C. for 5 minutes to form a 50 μm thick PSA layer B3. To release film R2 (MRE #38, Mitsubishi Plastics, Inc.), PSA composition S-2 was applied and allowed to dry at 130° ° C. for 5 minutes to form a 50 μm thick PSA layer B6. To PSA layer B3 on release film R1, was adhered nonwoven fabric (SP-14K, Daifuku Paper Mfg. Co., Ltd.). To the opposite side of the nonwoven fabric, was adhered PSA layer B6 on release film R2 to prepare a double-faced PSA sheet with PSA layers B3 and B6 layered via the nonwoven fabric as the middle layer.

Release film R2 covering PSA layer B6 was removed and the exposed surface was adhered to a 75 μm thick corona-treated PET film to obtain a laminate sheet with the PET film (support), PSA layer B6, nonwoven fabric, PSA layer B3 and release film R1 layered in this order.

Example 7

Into a three-necked 1-L flask, were placed and mixed 45 parts of caprolactone acrylate (ARONIX M5300, Toagosei Co. Ltd.), 50 parts of BA, 5 parts of sodium styrene sulfonate, 8.8 parts of potassium hydroxide, 96 parts of water, 144 parts of methanol and 0.175 part of AIBN. Under a nitrogen atmosphere, the reaction was carried out at 60° C. for 5 hours to obtain an acrylic polymer solution. To this solution, per 100 parts of the acrylic polymer, were added 20 parts of water-soluble plasticizer (product name SANNIX SP750 available from Sanyo Chemical, Ltd.) and 0.2 part of crosslinking agent (diglycidyl ether of polyethylene glycol having a polymerization degree of about 9; EX-830, Nagase ChemteX Corporation) and uniformly mixed to prepare PSA composition P-1.

In place of PSA composition E-1, was used PSA composition P-1 to form a water-swellable PSA layer. Otherwise in the same manner as Example 1, was prepared a PSA sheet according to this Example.

Example 8

In the same manner as Example 1, was obtain a laminate sheet with the PET film (support), PSA layer B1 and release film R1 layered in this order. Release film R1 covering PSA layer B1 of this laminate sheet was removed. To the exposed surface, was adhered a commercial water-soluble double-faced PSA tape (Clover Mfg Co., Ltd.) to prepare a PSA sheet according to this Example.

<Performance Test (1)>

With respect to the PSA sheets obtained in Examples 1 to 8, the normal adhesive strength N0, water-resistant adhesive strength N1 and water-peel strength N2 of the layer A side were determined by the methods described earlier. As the adherend, was used an alkaline glass plate (available from Matsunami Glass Ind., Ltd.; fabricated by a float method, 1.35 mm thick, blue slide glass with polished edges, 8° contact angle with distilled water on surface adhered to PSA sheet). From the results, were determined the water-resistant adhesive strength reduction rate and water-peel adhesive strength reduction rate. The results are shown in Table 1.

TABLE 1

| | PSA layer | | Normal adhesive strength | | Water resistance | | Water-peeling properties | |
|---|---|---|---|---|---|---|---|---|
| | | | | | Water-resistant adhesive | | Water-peel strength | |
| | Support side | Release film side | N0 (N/10 mm) | Peeling | strength N1 (N/10 mm) | Reduction rate (%) | N2 (N/10 mm) | Reduction rate (%) |
| Ex. 1 | U-1 | E-1 | 4.3 | none | 4.2 | 2 | 0.1 | 98 |
| Ex. 2 | U-1 | E-2 | 8.5 | none | 8.1 | 5 | 0.1 | 99 |
| Ex. 3 | S-2 | E-1 | 4.3 | none | 4.1 | 5 | 0.1 | 98 |
| Ex. 4 | U-1 | S-1 | 7.7 | none | 7.6 | 1 | 2.0 | 74 |
| Ex. 5 | | U-2 | 8.9 | none | 8.7 | 2 | 3.4 | 62 |
| Ex. 6 | S-2 | S-2 | 13.0 | none | 12.8 | 2 | 8.0 | 38 |
| Ex. 7 | U-1 | water-swellable | 3.1 | Peeled* | 0** | 100 | 0.2 | 94 |

TABLE 1-continued

| | PSA layer | | Normal adhesive strength N0 (N/10 mm) | Peeling | Water resistance | | Water-peeling properties | |
|---|---|---|---|---|---|---|---|---|
| | Support side | Release film side | | | Water-resistant adhesive strength N1 (N/10 mm) | Reduction rate (%) | Water-peel strength N2 (N/10 mm) | Reduction rate (%) |
| Ex. 8 | U-1 | water-soluble | 6.7 | Peeled | 3.2** | 52 | 0.7 | 90 |

*Entire test piece peeled and lifted.
**PSA residue found on adherend surface after removal of test piece As shown in Table 1, because of their low water resistant adhesive strength reduction rates and high water-peel adhesive strength reduction rates, the PSA sheets according to Examples 1 to 5 were easily peeled from the adherend using a small amount of water, and showed excellent water resistance reliability as well. In Examples 1 to 3, particularly great results were obtained. On the other hand, it was difficult to peel the PSA sheet according to Example 6 with water. The PSA sheets according to Examples 7 and 8 showed poor water resistance reliability. More specifically, with the PSA sheet according to Example 7, in the middle of the 30-minute water immersion, the entire test piece peeled and lifted by itself, whereby removal from water and peel strength measurement were impossible. Thus, in Table 1, for expediency, 0 N/10 mm is shown for the water-resistant adhesive strength N1 of Example 7. In the PSA sheet according to Example 8, the 30-minute water immersion also caused part of the test piece to lift up at an edge off the adherend. Some leftover adhesive residue was observed on the adherend surface after the PSA sheet according to Example 7 peeled off by itself due to the water immersion as well as on the adherend surface after the measurement of water-resistant adhesive strength N1 of the PSA sheet according to Example 8. On the other hand, with respect to the PSA sheets according to Examples 1 to 6, no leftover adhesive residue was observed on the adherend surface upon test piece removal, either in the measurement of water-resistant adhesive strength N1 or in the measurement of water-peel strength N2. While no specific values are shown, the PSA layers formed from PSA compositions U-1, U-2, S-1, S-2, E-1 and E-2 were all found to be water-insoluble and non-water-swellable.

<<Experiment 2>>
<Preparation of PSA Composition (2)>
(PSA Composition B-1)

Into a reaction vessel equipped with a condenser, nitrogen inlet, thermometer and stirrer, were placed 64.5 parts of BA, 6 parts of CHA, 9.6 parts of NVP, 5 parts of ISTA, 14.9 parts of 4HBA, 0.07 part of a thioglycerol as chain transfer agent and 122 parts of ethyl acetate as polymerization solvent. To this, was added 0.2 part of AIBN. Under a nitrogen atmosphere, solution polymerization was carried out to obtain a solution containing an acrylic polymer of Mw 60×10$^4$.

To the acrylic polymer solution obtained above, per 100 parts of the monomers used for preparing the solution, were added 0.09 part (non-volatiles) of isocyanate-based crosslinking agent (trimethylolpropane/xylylene diisocyanate adduct; TAKENATE D-110N available from Mitsui Chemicals, Inc.; 75% NV by mass), 0.4 part of acrylic oligomer, 0.02 part of dioctyltin dilaurate (EMBILIZER OL-1 available from Tokyo Fine Chemical Co., Ltd.) as crosslinking catalyst, 3 parts of acetylacetone as crosslinking retarder, 2.7 parts of dipentaerythritol hexaacrylate (DPHA) as polyfunctional monomer, and 0.22 part of IRGACURE 184 (available from Ciba Specialty Chemicals, Inc.) as photopolymerization initiator; and uniformly mixed to prepare PSA composition B-1.

The acrylic oligomer used above was synthesized by the method shown below.

[Synthesis of Acrylic Oligomer]

Into a 4-necked flask, were placed 100 parts of toluene, 60 parts of dicyclopentanyl methacrylate (DCPMA) (product name FA-513M available from Hitachi Chemical Co., Ltd.), 40 parts of methyl methacrylate (MMA) and 3.5 parts of α-thioglycerol as chain transfer agent. Under a nitrogen atmosphere, the reaction mixture was allowed to stir at 70° C. for one hour and 0.2 part of AIBN was added as thermal polymerization initiator. The reaction was carried out at 70° C. for 2 hours and then at 80 °C for 2 hours. Subsequently, the reaction mixture was placed under an atmosphere at a temperature of 130° C. to dry and remove toluene, chain transfer agent and unreacted monomers, whereby an acrylic oligomer in a solid state was obtained. This acrylic oligomer had a Tg of 144° C. and a Mw of 4300.

<PSA Sheet Preparation (2)>

Example 9

To a 38 μm thick release film R1 (MRF #38, Mitsubishi Plastics, Inc.) having a release face on one side of polyester film, PSA composition B-1 was applied and allowed to dry at 135° C. for 2 minutes to form a 130 μm thick photo-crosslinkable PSA layer B9. To PSA layer B9, was adhered a 75 μm thick corona-treated polyethylene terephthalate (PET) film to obtain a laminate sheet with the PET film (support), PSA layer B9 and release film R1 layered in this order.

To release film R1 (MRF #38, Mitsubishi Plastics, Inc.), PSA composition E-1 was applied and allowed to dry at 120° C. for 3 minutes to form a 20 μm thick PSA layer A1. Release film R1 covering PSA layer B9 of the laminate sheet was removed. To the exposed surface, PSA layer A1 was adhered to obtain a PSA sheet in an embodiment including a PSA layer having a two-layer structure with PSA layers B9 and A1 layered in this order on the PET film (support) and in direct contact with each other. The layer A1 side surface of the PSA sheet is protected with release film R1 used in forming the PSA layer A1.

<Performance Test (2)>

With respect to the PSA sheet obtained in Example 9, were determined the normal adhesive strength N0, water-resistant adhesive strength N1 and water-peel strength N2 of the layer A side. The respective measurements were carried out by the methods described earlier after the following procedures: Each PSA sheet was applied to an alkaline glass plate (adherend) (available from Matsunami Glass Ind., Ltd.; fabricated by the float method, 1.35 mm thick, blue slide glass with polished edges, 8° contact angle with distilled water on surface adhered to PSA sheet) by the method described earlier; and was subjected to light irradiation via the alkaline glass plate in an environment at 23° C. and 50% RH. The light irradiation was carried out by irradiation of UV light (cumulative dose of 3000 mJ/cm$^2$), using a high-pressure mercury lamp (300 mW/cm$^2$). From the results, were determined the water-resistant adhesive strength reduction rate and water-peel adhesive strength reduction rate. The results are shown in Table 2. It is noted that no leftover adhesive residue was observed on the adherend surface upon test piece removal, in the measurement of adhesive strength N0, N1 or N2. While no specific values are shown, the PSA layer B9 after the light irradiation was found to be water-insoluble and non-water-swellable.
<Preparation and Evaluation of PSA Sheet-Bearing Member>

Example 10

A commercial acrylic plate (product name ACRYLITE plate (product number 001) available from Mitsubishi Chemical Corporation, 2 mm thick, 200 mm wide, 300 mm long) was used as the member (adherend) in this Example, without any surface hydrophilization treatment in particular. The contact angle of the surface (bonding face) of the acrylic plate with distilled water was measured. Within 30 minutes from the contact angle measurement, to the surface, was adhered the layer A side of the PSA sheet according to Example 9 to prepare a PSA sheet-bearing member according to this Example. With respect to the PSA sheet-bearing member, in the same manner as the measurement of normal adhesive strength N0, water-resistant adhesive strength N1 and water-peel strength N2 except that the acrylic plate was used in place of the alkaline glass plate, the normal adhesive strength, water-resistant adhesive strength and water-peel strength of the PSA sheet according to Example 9 were determined relative to the adherend, and the water-resistant adhesive strength reduction rate and water-peel adhesive strength reduction rate were calculated. The results are shown in Table 2.

Examples 11 to 16

The bonding face of the same acrylic plates as the one used in Example 10 were subjected to plasma treatment, using an atmospheric pressure plasma surface treatment system (AP-T05 available from Sekisui Chemical Co., Ltd.). Under designated plasma treatment conditions (fixed conditions: at a distance of 4 mm from the plasma outlet to the acrylic plate surface, a nitrogen flow rate 60 L/min, a pulse width of 5 μs, with the voltage at 150 V; variable conditions: the speed of transferring the acrylic plate in the range between 0.2 m/min and 0.3 m/min, the frequency in the range between 10 Hz and 20 kHz), were obtained acrylic plates having bonding faces treated with the plasma treatment energy (Ws/cm$^2$) shown in Table 2. After the plasma treatment, within 30 minutes, was determined the contact angle of the bonding face of each acrylic plate. Within 30 minutes from the contact angle measurement, to the bonding faces of the respective acrylic plates, was adhered the layer A side of the PSA sheet according to Example 9 to prepare PSA sheet-bearing members according to Examples 11 to 16. With respect to these PSA sheet-bearing members, in the same manner as the PSA sheet-bearing member of Example 10, were determined the normal adhesive strength, water-resistant adhesive strength and water-peel adhesive strength of the PSA sheet according to Example 9 as well as the water-resistant adhesive strength reduction rate and water-peel adhesive strength reduction rate. The results are shown in Table 2.

Example 17

A 75 μm thick PET film (LUMIRROR S10 available from Toray Industries, Inc.; 75 μm thick) was used as the member (adherend) in this Example, without any surface hydrophilization treatment in particular. The contact angle of the surface (bonding face) of the PET film with distilled water was measured. Within 30 minutes from the contact angle measurement, to the surface, was adhered the layer A side of the PSA sheet according to Example 9 to prepare a PSA sheet-bearing member according to this Example. For operational convenience, the PET film was fixed to a surface of an alkaline glass plate available from Matsunami Glass Ind., Ltd. (fabricated by the float method, 1.35 mm thick, blue slide glass with polished edges) with double-faced PSA tape (product name "No. 5000" available from Nitto Denko Corporation) and used. With respect to the PSA sheet-bearing member, in the same manner as the measurement of normal adhesive strength N0, water resistant adhesive strength N1 and water-peel strength N2 except that the PET film was used in place of the alkaline glass plate, the normal adhesive strength, water-resistant adhesive strength and water-peel strength of the PSA sheet according to Example 9 were determined relative to the adherend, and the water-resistant adhesive strength reduction rate and water-peel adhesive strength reduction rate were calculated. The results are shown in Table 2.

Examples 18 and 19

To the bonding face of the same PET film as the one used in Example 17, a hydrophilic coating agent was applied using a wire bar #5 (available from RDS Co., Ltd.) and then allowed to dry at 120° C. for 2 minutes to form hydrophilic coating layers of 0.2 μm to 0.5 μm in thickness. As the hydrophilic coating agent, were used product name COLCOAT PC-301 ("PC-301" in Table 2) in Example 18 and product name COLCOAT N-103X ("N-103X" in Table 2) in Example 19, both available from Colcoat Co., Ltd. PET films having hydrophilized surfaces thus obtained were used as the members (adherends) in Examples 18 and 19. Otherwise in the same manner as Example 17, were prepared PSA sheet-bearing members according to Examples 18 and 19. With respect to these PSA sheet-bearing members, in the same manner as the PSA sheet-bearing member of Example 17, the normal adhesive strength, water resistant adhesive strength and water-peel strength of the PSA sheet according to Example 9 were determined, and the water-resistant adhesive strength reduction rate and water peel adhesive strength reduction rate were calculated. The results are shown in Table 2.

Example 20

An alkaline glass plate fabricated by a float method (available from Matsunami Glass Ind., Ltd.; 1.35 mm thick, blue slide glass with polished edges, 8° contact angle with distilled water on surface) was prepared. With an atmospheric pressure plasma surface treatment system (AP-T05 available from Sekisui Chemical Co., Ltd.), the surface of the alkaline glass plate was subjected to plasma treatment at a plasma treatment energy (Ws/cm$^2$) shown in Table 2. The contact angle of the plasma treated surface (bonding face) with distilled water was measured. Within 30 minutes from the contact angle measurement, to the surface, was adhered the layer A side of the PSA sheet according to Example 9 to prepare a PSA sheet-bearing member according to this Example. With respect to the PSA sheet-bearing member, in the same manner as the measurement of normal adhesive strength N0, water-resistant adhesive strength N1 and water-peel strength N2 except that the plasma treated alkaline glass plate was used in place of the untreated alkaline glass plate, the normal adhesive strength, water-resistant adhesive strength and water peel strength of the PSA sheet according to Example 9 were determined relative to the adherend, and the water-resistant adhesive strength reduction rate and water-peel adhesive strength reduction rate were calculated. The results are shown in Table 2.

Shin-Etsu Chemical Co., Ltd.) as silane coupling agent, 0.1 part of nonionic surfactant A (polyoxyethylene sorbitan monolaurate, HLB 13.3, product name RHEIDOL TW-L106 available from Kao Corporation) as hydrophilicity enhancer, 0.09 part (non-volatiles) of isocyanate-based crosslinking agent (trimethylolpropane/xylylene diisocyanate adduct; TAKENATE D-110N available from Mitsui Chemicals, Inc.; 75% NV by mass), 0.4 part of acrylic oligomer, 0.02 part of dioctyltin dilaurate (EMBILIZER OL-1 available from Tokyo Fine Chemical Co., Ltd.) as crosslinking catalyst, 3 parts of acetylacetone as crosslinking retarder, 2.7 parts of DPHA as polyfunctional monomer, and 0.22 part of IRGACURE 184 (available from Ciba Specialty Chemicals, Inc.) as photopolymerization initiator; and uniformly mixed to prepare a solvent-based PSA composition B-2.

TABLE 2

| | PSA layer | | Adherend | | | | Water resistance | | Water-peeling properties | |
|---|---|---|---|---|---|---|---|---|---|---|
| | Support side | Release film side | Type | Plasma treatment energy (Ws/cm2) | Hydrophilic coating agent | Contact angle (deg.) | Normal adhesive strength to adherend (N/10 mm) | Water-resistant adhesive strength to adherend (N/10 mm) | Reduction rate (%) | Water-peel strength to adherend (N/10 mm) | Reduction rate (%) |
| Ex. 9 | B-1 | E-1 | alkaline glass | untreated | none | 8 | 3.5 | 3.4 | 3 | 0.1 | 97 |
| Ex. 10 | B-1 | E-1 | acrylic plate | untreated | none | 61 | 7.3 | 7.1 | 2 | 6.7 | 8 |
| Ex. 11 | B-1 | E-1 | acrylic plate | 1.6 | none | 52 | 6.5 | 6.4 | 2 | 4.5 | 31 |
| Ex. 12 | B-1 | E-1 | acrylic plate | 2.3 | none | 49 | 6.7 | 6.5 | 3 | 2.9 | 58 |
| Ex. 13 | B-1 | E-1 | acrylic plate | 4.7 | none | 48 | 6.3 | 6.1 | 2 | 2.0 | 68 |
| Ex. 14 | B-1 | E-1 | acrylic plate | 8.7 | none | 45 | 6.0 | 5.9 | 2 | 1.7 | 7. |
| Ex. 15 | B-1 | E-1 | acrylic plate | 14.6 | none | 42 | 6.2 | 6.1 | 2 | 1.3 | 79 |
| Ex. 16 | B-1 | E-1 | acrylic plate | 21.9 | none | 38 | 6.0 | 5.9 | 2 | 1.1 | 83 |
| Ex. 17 | B-1 | E-1 | PET film | untreated | none | 62 | 4.5 | 4.4 | 2 | 4.4 | 2 |
| Ex. 18 | B-1 | E-1 | PET film | untreated | PS301 | 28 | 3.5 | 3.3 | 6 | 0.9 | 74 |
| Ex. 19 | B-1 | E-1 | PET film | untreated | N-103X | 26 | 2.3 | 2.2 | 4 | 0.1 | 96 |
| Ex. 20 | B-1 | E-1 | alkaline glass | 21.9 | none | 1 | 3.7 | 3.6 | 3 | 0.1 | 97 |

As shown in Table 2, because of the low water-resistant adhesive strength reduction rate and high water-peel adhesive strength reduction rate, the PSA sheet according to Example 9 showed good water-peeling properties and water resistance reliability. The results shown in Table 2 indicates that, in the PSA sheet-bearing members of Examples 10 to 20, the water-peeling properties generally improve with decreasing contact angle of the surface in contact with the PSA layer of the member (adherend).

<<Experiment 3>>
<Preparation of PSA Composition (3)>
(PSA Composition B-2)
To the acrylic polymer solution obtained in PSA composition B-1, per 100 parts of the monomers used for preparing the solution, were added 0.33 part of 3-glycidoxypropyltrimethoxysilane (product name KBM-403 available from (PSA Composition B-3)
As the hydrophilicity enhancer, in place of 0.1 part of nonionic surfactant A, was used 0.1 part of an anionic surfactant (sodium lauryl sulfate, product name EMAL 10G available from Kao Corporation). Otherwise in the same manner as PSA composition B-2, was prepared PSA composition B-3.
(PSA Composition B-4)
As the hydrophilicity enhancer, in place of 0.1 part of nonionic surfactant A, was used 0.05 part of nonionic surfactant F (polyoxyethylene lauryl ether, HLB 12.1, product name EMALGEN 108 available from Kao Corporation). Otherwise in the same manner as PSA composition B-2, was prepared PSA composition B-4.
(PSA Composition B-5)
Nonionic surfactant A was not used. Otherwise in the same manner as PSA composition B-2, was prepared PSA composition B-5.

(PSA Composition B-6)

To PSA composition U-1, per 100 parts of the monomer syrup used to prepare the composition, was further added and uniformly mixed, as a hydrophilicity enhancer, 0.15 part of nonionic surfactant G (polyoxyethylene sorbitan monolaurate, HLB 16.7, product name RHEODOL TW-L120 available from Kao Corporation) to prepare UV ray-curable PSA composition B-6.

(PSA Composition B-7)

As the hydrophilicity enhancer, in place of 0.15 part of nonionic surfactant G, was used 0.25 part of PEG400 (polyethylene glycol, average molecular weight 360 to 440). Otherwise in the same manner as PSA composition B-6, was prepared PSA composition B-7.

(PSA Composition B-8)

Nonionic surfactant G was not used. Otherwise in the same manner as PSA composition B-6, was prepared PSA composition B-8.

<PSA Sheet Preparation (3)>

Example 21

To a 38 μm thick release film R1 (MRF #38, Mitsubishi Plastics, Inc.) having a release face on one side of polyester film, PSA composition B-2 was applied and allowed to dry at 135° C. for 2 minutes to form a 50 μm thick photo-crosslinkable PSA layer. To this PSA layer, was adhered a 50 μm thick corona-treated PET film to obtain an on-support PSA sheet having the PSA layer on the PET film (support). Of the PSA sheet, the adherend-bonding face (the surface on the reverse side of the support-bearing side of the PSA layer) is protected with release film R1.

was allowed to cure by UV irradiation to form a 50 μm thick photo-crosslinkable PSA layer. Subsequently, release film R2 covering the PSA layer was removed. To the exposed surface, was adhered a 50 μm thick corona-treated PET film to obtain an on-support PSA sheet having the PSA layer on the PET film (support). The adherend-bonding face of the PSA sheet is protected with release film R1.

Examples 26 and 27

In place of PSA composition B-6, were used PSA composition B-7 and B-8, respectively. Otherwise in the same manner as Example 25, were prepared PSA sheets according to the respective Examples.

<Performance Test (3)>

With respect to the PSA sheets obtained in Examples 21 to 27, the normal adhesive strength N0, water-resistant adhesive strength N1 and water-peel strength N2 of the layer A side were determined by the methods described earlier. The respective measurements were carried out by the methods described earlier after the following procedures: Each PSA sheet was applied to an alkaline glass plate (adherend) (available from Matsunami Glass Ind., Ltd.; fabricated by the float method, 1.35 mm thick, blue slide glass with polished edges, 8° contact angle with distilled water on surface adhered to PSA sheet) by the method described earlier; and was subjected to light irradiation via the alkaline glass plate in an environment at 23° ° C. and 50% RH. The light irradiation was carried out by irradiation of UV light (cumulative dose of 3000 mJ/cm$^2$), using a high-pressure mercury lamp (300 mW/cm$^2$). From the results, were determined the water-resistant adhesive strength reduction rate and water-peel adhesive strength reduction rate. The results are shown in Table 3.

TABLE 3

| | | | | Water resistance | | Water-peeling properties | |
|---|---|---|---|---|---|---|---|
| | | | Normal adhesive | Water-resistant | | | |
| | PSA sheet | | strength N0 | adhesive strength N1 | Reduction rate | Water-peel strength N2 | Reduction |
| | Support | PSA layer | (N/10 mm) | (N/10mm) | (%) | (N/10 mm) | rate (%) |
| Ex. 21 | PET film | B-2 | 8.5 | 8.3 | 2 | 1.1 | 87 |
| Ex. 22 | PET film | B-3 | 8.1 | 7.9 | 2 | 1.3 | 84 |
| Ex. 23 | PET film | B-4 | 7.8 | 7.6 | 3 | 1.2 | 85 |
| Ex. 24 | PET film | B-5 | 8.2 | 8.1 | 1 | 3.4 | 59 |
| Ex. 25 | PET film | B-6 | 19.5 | 19.4 | 1 | 0.3 | 98 |
| Ex. 26 | PET film | B-7 | 19.8 | 19.2 | 3 | 0.8 | 96 |
| Ex. 27 | PET film | B-8 | 20.3 | 20.0 | 1 | 7.5 | 63 |

Examples 22 to 24

In place of PSA composition B-2, were used PSA composition B-3 to B-5, respectively. Otherwise in the same manner as Example 21, were prepared PSA sheets according to the respective Examples.

Example 25

To a 38 μm thick release film R1 (MRF #38 available from Mitsubishi Plastics, Inc.) having a release face on one side of polyester film, PSA composition B-6 was applied and covered with a 38 μm thick release film R2 (MRE #38 available from Mitsubishi Plastics, Inc.) having a release face on one side of polyester film to block air. The resultant As shown in Table 3, because of their low water resistant adhesive strength reduction rates and high water-peel adhesive strength reduction rates, the PSA sheets according to Examples 21 to 27 were easily peeled from the adherend using a small amount of water, and showed excellent water resistance reliability as well. In Examples 21 to 23, 25 and 26, particularly great results were obtained. While no specific values are shown, the PSA layers formed from PSA compositions B-2 to B-8 were all found to be water-insoluble and non-water-swellable.

<<Experiment 4>>

Among the PSA sheets prepared in Experiments 1 and 3, those shown in Table 4 were subjected to constant load peel tests by the method described earlier to determine their dry peel distances and water penetration distances. The results are shown in Table 4. With respect to Example 1, within 10 seconds from the supply of distilled water, peeling progressed through the end of the test piece and the test piece fell off the adherend. Thus, ">100 (mm)" is shown for the water-peel distance. Table 4 also shows the water-resistant adhesive strength reduction rates of the respective PSA sheets determined in Experiments 1 and 3.

TABLE 4

| | Water-resistant adhesive strength reduction rate (%) | Constant load peel test | |
|---|---|---|---|
| | | Dry peel distance (mm) | Water penetration distance (mm) |
| Ex. 1 | 2 | 0 | >100 |
| Ex. 2 | 5 | 0 | 95 |
| Ex. 6 | 2 | 0 | 0 |
| Ex. 21 | 2 | 0 | 25 |
| Ex. 23 | 3 | 0 | 20 |

As shown in Table 4, the PSA sheets according to Examples 1, 2, 21 and 23 showed good holding properties before water was supplied to the interface because they had short dry peel distances; and upon supply of water to the interface, they were easily peeled from the adherend. Because of their low water resistant adhesive strength reduction rates, these PSA sheets had excellent water resistance reliability as well.

Although specific embodiments of the present invention have been described in detail above, these are merely for illustrations and do not limit the scope of claims. The art according to the claims includes various modifications and changes made to the specific embodiments illustrated above.

REFERENCE SIGNS LIST 1,2 PSA sheets
10 PSA layer (layer A)
10A first surface (adhesive face)
10B second surface
20 support
20A first face
20B second face (backside)
30 release liner
50 release-linered PSA sheets
70 member
80 alkaline glass plate (adherend)
80A surface having a contact angle of 5° to 10° with distilled water
82 test piece
82A adhesive face
822 one end
84 weight
86 micro-syringe
110 PSA layer
110A first surface (adhesive face)
112 layer A
114 layer B
200 PSA sheet-bearing member

The invention claimed is:

1. A pressure-sensitive adhesive sheet having a pressure-sensitive adhesive layer,
wherein the pressure-sensitive adhesive layer comprises a layer A forming at least one surface of the pressure-sensitive adhesive layer;
wherein the layer A is a layer formed from a photocurable pressure-sensitive adhesive composition or a solvent-based pressure-sensitive adhesive composition;
wherein the layer A further comprises a hydrophilicity enhancer, wherein the hydrophilicity enhancer comprises a surfactant selected from the group consisting of anionic surfactants; cationic surfactants; and nonionic surfactants having an HLB value of at least 3 and no more than 18 or less; and
the pressure-sensitive adhesive sheet has:
an adhesive strength N0 of 2.0 N/10 mm or greater, after one day at room temperature following application of the layer A side to a surface of an alkaline glass plate as an adherend fabricated by a float method, the surface of the glass plate has a contact angle of 5° to 10° with distilled water;
a water-resistant adhesive strength reduction rate of 30% or lower, determined by a first formula $(1-(N1/N0)) \times 100$ based on a water-resistant adhesive strength N1 (N/10 mm) and an adhesive strength N0 (N/10 mm), wherein N1 is measured after the layer A side is applied to a surface of an alkaline glass plate as an adherend fabricated by a float method with the surface of the alkaline glass plate having a contact angle of 5° to 10° with distilled water, and a resultant assembly is stored at room temperature for one day, immersed in water for 30 minutes, taken out from the water and then residual water is wiped off; and
a water-peel adhesive strength reduction rate of 75% or higher, determined by a second formula $(1-(N2/N0)) \times 100$ based on a water-peel strength N2 (N/10 mm) and an adhesive strength N0 (N/10 mm), wherein N2 is measured according to JIS Z0237: 2009 "10.4.1 Method 1: 180° Peel Strength to Test Plate" after the layer A side is applied to a surface of an alkaline glass plate as an adherend fabricated by a float method with the surface of the alkaline glass plate having a contact angle of 5° to 10° with distilled water, stored at room temperature for one day, 20 μL of distilled water is dropped onto the adherend and the distilled water is allowed to enter an interfacial edge between the pressure-sensitive adhesive layer and the adherend; in particular, measured using a tensile tester at a test temperature of 23° C. at a tensile speed of 300 mm/min at a peel angle of 180°, and
wherein the hydrophilicity enhancer is included in an amount of at least 0.01 part by weight up to 20 parts by weight relative to 100 parts by weight of monomers forming a polymer included in the layer A.

2. The pressure-sensitive adhesive sheet according to claim 1, wherein the layer A is water-insoluble and non-water-swellable.

3. The pressure-sensitive adhesive sheet according to claim 1, wherein
the layer A is formed with an acrylic pressure-sensitive adhesive comprising an acrylic polymer, and
at least 50% by weight of monomers forming the acrylic polymer is an alkyl (meth)acrylate having an alkyl group with 1 to 20 carbon atoms at its ester terminus.

4. The pressure-sensitive adhesive sheet according to claim 1, wherein the pressure-sensitive adhesive layer has a thickness of 10 μm or greater and 200 μm or less.

5. The pressure-sensitive adhesive sheet according to claim 1, wherein the pressure-sensitive adhesive layer further comprises a layer B placed on a backside of the layer A.

6. The pressure-sensitive adhesive sheet according to claim 5, wherein the layer B is placed in direct contact with a backside of the layer A.

7. The pressure-sensitive adhesive sheet according to claim 5, wherein the layer B has a thickness of 20 μm or greater.

8. The pressure-sensitive adhesive sheet according to claim 5, wherein the layer A has a thickness of 5 μm or greater and 50 μm or less.

9. The pressure-sensitive adhesive sheet according to claim 5, wherein
the layer B is a layer formed from a photocurable pressure-sensitive adhesive composition or a solvent-based pressure-sensitive adhesive composition.

10. The pressure-sensitive adhesive sheet according to claim 1, wherein the water-peel strength N2 is 3.0 N/10 mm or less.

11. A pressure-sensitive adhesive sheet-bearing member comprising the pressure-sensitive adhesive sheet according to claim 1, and a member bonded to the one surface of the pressure-sensitive adhesive layer.

12. The pressure-sensitive adhesive sheet-bearing member according to claim 11, wherein the member has a contact angle of 50° or smaller with distilled water on its surface in contact with the pressure-sensitive adhesive layer.

13. A method for peeling a pressure-sensitive adhesive sheet adhered on an adherend, the method including a water-peel step in which the pressure-sensitive adhesive sheet is peeled from the adherend, in a state where an aqueous liquid exits at an interface between the adherend and the pressure-sensitive adhesive sheet at a front line of peeling the pressure-sensitive adhesive sheet from the adherend, with the aqueous liquid allowed to further enter the interface following a movement of the peel front line, wherein
the pressure-sensitive adhesive sheet has a pressure-sensitive adhesive layer;
the pressure-sensitive adhesive layer comprises a layer A forming at least one surface of the pressure-sensitive adhesive layer;
the layer A is a layer formed from a photocurable pressure-sensitive adhesive composition or a solvent-based pressure-sensitive adhesive composition;
wherein the layer A further comprises a hydrophilicity enhancer, wherein the hydrophilicity enhancer comprises a surfactant selected from the group consisting of anionic surfactants; cationic surfactants; and nonionic surfactants having an HLB value of at least 3 and no more than 18; and
the pressure-sensitive adhesive sheet has:
an adhesive strength N0 of 2.0 N/10 mm or greater, after one day at room temperature following application of the layer A side to a surface of an alkaline glass plate as an adherend fabricated by a float method, the surface of the glass plate has a contact angle of 5° to 10° with distilled water;
a water-resistant adhesive strength reduction rate of 30% or lower, determined by a first formula $(1-(N1/N0))\times 100$ based on its water-resistant adhesive strength N1 (N/10 mm) and the adhesive strength N0 (N/10 mm), wherein N1 is measured after the layer A side is applied to a surface of an alkaline glass plate as an adherend fabricated by a float method with the surface of the glass plate having a contact angle of 5° to 10° with distilled water, and a resultant assembly is stored at room temperature for one day, immersed in water for 30 minutes, taken out from the water and then residual water is wiped off; and
a water-peel adhesive strength reduction rate of 75% or higher, determined by a second formula $(1-(N2/N0))\times 100$ based on its water-peel strength N2 (N/10 mm) and an adhesive strength N0 (N/10 mm), wherein N2 is measured according to JIS Z0237: 2009 "10.4.1 Method 1: 180° Peel Strength to Test Plate" after the layer A side is applied to a surface of an alkaline glass plate as an adherend fabricated by a float method with the surface of the alkaline glass plate having a contact angle of 5° to 10° with distilled water, stored at room temperature for one day, 20 μL of distilled water is dropped onto the adherend and the distilled water is allowed to enter an interfacial edge between the pressure-sensitive adhesive layer and the adherend; in particular, measured using a tensile tester at a test temperature of 23° ° C. at a tensile speed of 300 mm/min at a peel angle of 180°, and
wherein the hydrophilicity enhancer is included in an amount of at least 0.01 part by weight up to 20 parts by weight relative to 100 parts by weight of monomers forming a polymer included in the layer A.

14. The peeling method according to claim 13, wherein the peel front line is allowed to move at a speed of at least 10 mm/min in the water-peel step.

15. A method for producing a pressure-sensitive adhesive sheet-bearing member, the method including:
a step of peeling a pressure-sensitive adhesive sheet from an adherend member by the peeling method according to claim 13, and
a step of applying, to the member from which the pressure-sensitive adhesive sheet has been peeled off, a pressure-sensitive adhesive sheet different from the peeled pressure-sensitive adhesive sheet.

16. A pressure-sensitive adhesive sheet having a pressure-sensitive adhesive layer,
wherein
the pressure-sensitive adhesive layer comprises a layer A forming at least one surface of the pressure-sensitive adhesive layer;
the layer A is a layer formed from a photocurable pressure-sensitive adhesive composition or a solvent-based pressure-sensitive adhesive composition;
wherein the layer A further comprises a hydrophilicity enhancer, wherein the hydrophilicity enhancer comprises a surfactant selected from the group consisting of anionic surfactants; cationic surfactants; and nonionic surfactants selected from the group consisting of polyoxyethylene alkyl ethers, polyoxyethylene alkyl phenyl ethers, sorbitan fatty acid esters, polyoxyethylene sorbitan fatty acid esters, polyoxyethylene glyceryl ether, polyoxypropylene glyceryl ether, polyoxyethylene bisphenol A ether, polyoxyethylene fatty acid esters, and polyoxyethylene glyceryl ether fatty acid esters; and
the pressure-sensitive adhesive sheet has:
an adhesive strength N0 of 2.0 N/10 mm or greater, after one day at room temperature following application of the layer A side to a surface of an alkaline glass plate as an adherend fabricated by a float method, the surface of the glass plate has a contact angle of 5° to 10° with distilled water;
a water-resistant adhesive strength reduction rate of 30% or lower, determined by a first formula $(1-(N1/N0))\times 100$ based on a water-resistant adhesive strength N1 (N/10 mm) and an adhesive strength N0

(N/10 mm), wherein N1 is measured after the layer A side is applied to a surface of an alkaline glass plate as an adherend fabricated by a float method with the surface of the alkaline glass plate having a contact angle of 5° to 10° with distilled water, and a resultant assembly is stored at room temperature for one day, immersed in water for 30 minutes, taken out from the water and then residual water is wiped off; and a water-peel adhesive strength reduction rate of 75% or higher, determined by a second formula $(1-(N2/N0))\times 100$ based on a water-peel strength N2 (N/10 mm) and an adhesive strength N0 (N/10 mm), wherein N2 is measured according to JIS Z0237: 2009 "10.4.1 Method 1: 180° Peel Strength to Test Plate" after the layer A side is applied to a surface of an alkaline glass plate as an adherend fabricated by a float method with the surface of the alkaline glass plate having a contact angle of 5° to 10° with distilled water, stored at room temperature for one day, 20 μL of distilled water is dropped onto the adherend and the distilled water is allowed to enter an interfacial edge between the pressure-sensitive adhesive layer and the adherend; in particular, measured using a tensile tester at a test temperature of 23° C. at a tensile speed of 300 mm/min at a peel angle of 180°, and wherein the hydrophilicity enhancer is included in an amount of at least 0.01 part by weight up to 20 parts by weight relative to 100 parts by weight of monomers forming a polymer included in the layer A.

17. The pressure-sensitive adhesive sheet according to claim 16, wherein the layer A is water-insoluble and non-water-swellable.

18. The pressure-sensitive adhesive sheet according to claim 16, wherein the layer A is formed with an acrylic pressure-sensitive adhesive comprising an acrylic polymer, and at least 50% by weight of monomers forming the acrylic polymer is an alkyl (meth)acrylate having an alkyl group with 1 to 20 carbon atoms at its ester terminus.

19. The pressure-sensitive adhesive sheet according to claim 16, wherein the pressure-sensitive adhesive layer further comprises a layer B comprising a photocurable pressure-sensitive adhesive composition or a solvent-based pressure-sensitive adhesive composition wherein the layer B is arranged on a backside of the layer A.

20. The pressure-sensitive adhesive sheet according to claim 19, wherein the layer B has a thickness of at least 20 μm and the layer A has a thickness from 5 μm to 50 μm.

* * * * *